US007272133B2

(12) United States Patent
Valin et al.

(10) Patent No.: US 7,272,133 B2
(45) Date of Patent: Sep. 18, 2007

(54) METHOD AND SYSTEM FOR IMPLEMENTING STANDARD APPLICATIONS ON AN INTELLIGENT NETWORK SERVICE CONTROL POINT THROUGH AN OPEN SERVICES GATEWAY

(75) Inventors: Steven Valin, Mendham, NJ (US); Sanjay Bhudia Patel, Milltown, NJ (US); Marvin Severson, Alberta (CA); Shelly Sims, Hillsborough, NJ (US); Jobin Thomas, Piscataway, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 940 days.

(21) Appl. No.: 10/216,943

(22) Filed: Aug. 12, 2002

(65) Prior Publication Data
US 2004/0028031 A1 Feb. 12, 2004

(51) Int. Cl.
*H04L 12/66* (2006.01)
*H04M 1/64* (2006.01)
*G06F 15/16* (2006.01)

(52) U.S. Cl. .................. 370/352; 370/401; 379/88.17; 709/218; 709/249

(58) Field of Classification Search ................ 370/352, 370/401; 379/88.17; 709/218, 249
See application file for complete search history.

(56) References Cited
U.S. PATENT DOCUMENTS

| 5,519,772 | A | * | 5/1996 | Akman et al. ......... 379/221.08 |
| 5,533,115 | A | * | 7/1996 | Hollenbach et al. ... 379/221.11 |
| 5,915,008 | A | * | 6/1999 | Dulman ................. 379/221.08 |
| 6,094,479 | A | * | 7/2000 | Lindeberg et al. ..... 379/220.01 |
| 6,178,438 | B1 | * | 1/2001 | Tschirhart et al. .......... 709/200 |
| 6,243,451 | B1 | * | 6/2001 | Shah et al. ............ 379/201.03 |
| 6,333,931 | B1 | * | 12/2001 | LaPier et al. ................ 370/385 |
| 2002/0129113 | A1 | * | 9/2002 | Larsson ...................... 709/208 |
| 2002/0150079 | A1 | * | 10/2002 | Zabawskyj et al. ......... 370/351 |

OTHER PUBLICATIONS

Telcordia Technologies Special Report SR-5202, "ISCP Generic Data Interface Specification for TCP/IP," Issue 1, Oct. 2001.

* cited by examiner

*Primary Examiner*—Alpus H. Hsu
(74) *Attorney, Agent, or Firm*—Joseph Giordano

(57) ABSTRACT

Telecommunications service providers are increasingly relying on third party applications developed in accordance with industry standard application programming interfaces (API's). In order to decouple the connection between the standard API's and the telecommunications network, the present invention creates a translation layer or open services gateway (OSG). The open services gateway enables an application written to conform to an industry standard API to be used despite changes in the underlying network. The OSG encapsulates the commands from the API's in a TCP/IP packet which is formatted in accordance with a generic data interface specification for an intelligent network services control point. In this manner there is no hard-coded coupling between open standard API's and the telecommunications network. Additionally, the intelligent network services control point can perform important interference monitoring functions.

22 Claims, 11 Drawing Sheets

METHOD AND SYSTEM FOR IMPLEMENTING STANDARD APPLICATIONS ON AN INTELLIGENT NETWORK SERVICE CONTROL POINT THROUGH AN OPEN SERVICES GATEWAY

FIELD OF THE INVENTION

This invention is related to a method and system for providing a gateway between third party applications and the underlying functionality of a telecommunications network by providing server objects that implement the interfaces defined in the open standard application programming interfaces (API's). More specifically, the method and system provides a way to implement standard API's in a telecommunications network using an existing intelligent network service control point.

BACKGROUND

In the current telecommunications environment many standards organizations such as 3GPP, 3GPP2, Parlay and Sun Microsystems' Jain® technology initiative have been busy developing various open standards-based services architectures and API's in order to permit more efficient development and integration of new and innovative telecommunications applications. For example, the Media Gateway Control Protocol (MGCP) controls (trunking) gateways that interconnect the Public Switched Telephone Network (PSTN) with packet networks and for controlling (residential) gateways that function as network interfaces for customer premise located equipment (e.g., phones with an RJ-11 jack). Thus, service creators are interested in developing services based on the standard open API's.

Currently, gateways between third party applications and the underlying telecommunications network use either hard-coded API to Network Protocol mappings or have been implemented directly on top of the Network Elements themselves.

It would be desirable to have a system and method that could implement standard API's without having to specifically code the mapping to the underlying Network Protocols.

Further it would be desirable to have a system and method to implement standard API's without having to implement them directly on top of the Network Elements themselves.

It is desirable to have a means to implement standard API's that are decoupled from the underlying signaling network.

SUMMARY

In accordance with the present invention an open services gateway method and system translate standard API's into an object-oriented format that can be used to control the underlying network functionality. The present invention provides a novel method for providing server objects that implement the interfaces defined in the standards.

In the method of the present invention the open services gateway server object invokes service logic running on the intelligent network services control point® intelligent network service control point created using the SPACE® graphical programming environment. Service invocation is accomplished via a tag-value based Transmission Control Protocol/Internet Protocol (TCP/IP) message, the Invoke App message defined in SR-5202, *ISCP Generic Data Interface Specification for TCP/IP* which document is herein incorporated by reference. The intelligent network services control point service logic, in turn, communicates with the other network elements such as the MSC, HLR, SGSN, GGSN using standard telecommunications protocols such as INAP, CAP and MAP to request services from the network such as call connect. The generic data interface (GDI) tag/value commends are mapped to CAP or MAP messages and the call model is enforced on the ISCP. Conversely, the network elements can notify the intelligent network services control point of specific events such as phone-off-hook, call terminated or request services of the intelligent network services control point such as routing number translation or subscriber authentication.

The service applications use the standard APIs to communicate with the intelligent network services control point through the open services gateway using tag-value based messages over a TCP/IP connection. The intelligent network services control point service logic then interprets and translates these tag-value pairs into signaling network protocol messages. The process is the reverse for messages originating in the signaling network. Messages arrive at the intelligent network services control point where they are interpreted and translated by the service logic into tag-value pairs that are sent back to the open services gateway via a TCP/IP connection. The open services gateway then translates the tag-value pairs into a format that is in accordance with the standard API of the application.

This approach has at least three distinct advantages. First heterogeneous networks and network protocols can easily be supported with the same gateway. Because the gateway is decoupled from the network protocols via the intelligent network services control point service logic, the same gateway can simultaneously support fixed, mobile, and even packet-based network signaling protocols such as INAP, AIN, CAP, WIN, SIP/MGCP. Second, modifications necessary to support individual network idiosyncrasies such as proprietary extensions to standard protocols, or even entirely new protocols require only service logic modification to the intelligent network services control point and does not require changes to the source code of the gateway provided, of course, that these protocols or extensions are supported by the intelligent network services control point. Service logic changes may be implemented using the Telcordia™ SPACE® service creation and provisioning sytstem. Finally, by delegating the network signaling aspects to the intelligent network services control point provides the possibility to manage potential feature interactions between the applications that utilize the API's and the Intelligent Network services already deployed in the network such as prepaid services or virtual private networks (VPN's).

The present method and system provides a mechanism that permits rapid development of new standard API's and API extensions and of new API to network signaling protocol mappings.

DETAILED DESCRIPTION

Figure 1:
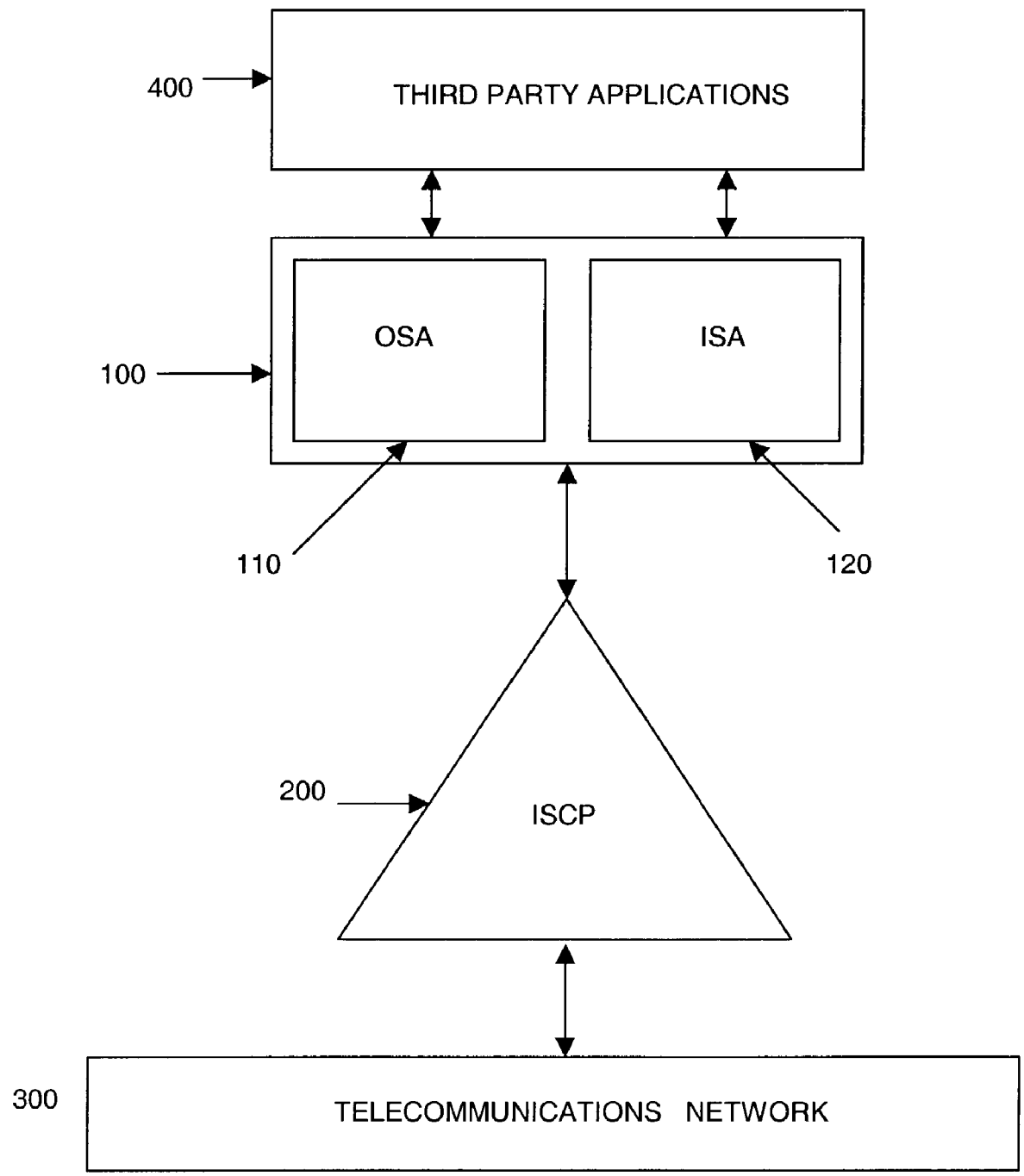
FIG. 1 depicts the architecture of the present invention in relationship to the standard applications and the intelligent network services control point.

FIG. 1 depicts the service layer architecture of the open services gateway of the present invention and its relationship to the third party applications 400 and the intelligent services control point 200. Third party applications 400 are a wide variety of telecommunication services applications that are developed to operate using open, standards-based application programming interfaces (API's) for performing various functions within a telecommunications network 300. An intelligent network service control point 200 such as the Telcordia™ intelligent network services control point® intelligent network services control point is a high-availability, high-performance platform engineered to operate continuously in a multi-application environment and support wireless and wireline global and IP-based signaling protocols with the intelligence to store, route, screen, and manage huge stores of customer data.

The open services gateway 100 has two sets of capabilities. Open services architecture (OSA) 110 is the architecture defined by the 3GPP standards organization. The OSA API is written in Common Object Request Broker Architecture (CORBA). The intelligent network services control point Service Access (ISA) 120 is the other possible translation capability of the OSG. The ISA API expands the OSA with additional functionality provided by the intelligent network services control point 200 allowing third party service providers to define features that are not currently part of the OSA set of features. The ISA API provides a natural mapping from the CORBA IDL world to a tag-value based TCP/IP message and vice-versa. The ISA API's are implemented either in the CORBA language or the JAVA language.

OSG translates the OSA APIs to intelligent network services control point specific APIs and functions as the middle tier entity between service applications and intelligent network services control point Customized Application for Mobile Network Enhanced Logic (CAMEL) capability features. It also supports intelligent network services control point access at a different layer (outside the scope of OSA), which is referred to as intelligent network services control point (ISCP) Service Access (ISA) 120.

In a preferred embodiment, the interface to intelligent network services control point 200 is the InvokeApp command of the Generic Data Interface (GDI) 150 specified in Telcordia Special Report SR-5202 dated October 2001 and incorporated by reference. Because the open services gateway 100 maps standard open APIs to Telcordia specific intelligent network services control point capabilities, GDI 150 is an important interface. Consequently, it is important to integrate the GDI 150 with the rest of the OSG modules that comprise the functionality of OSG 100 as well as to understand options to the GDI 150. CORBA could also be used to implement the interface between the OSG 100 and intelligent network services control point 200 in a future release.

Figure 2:
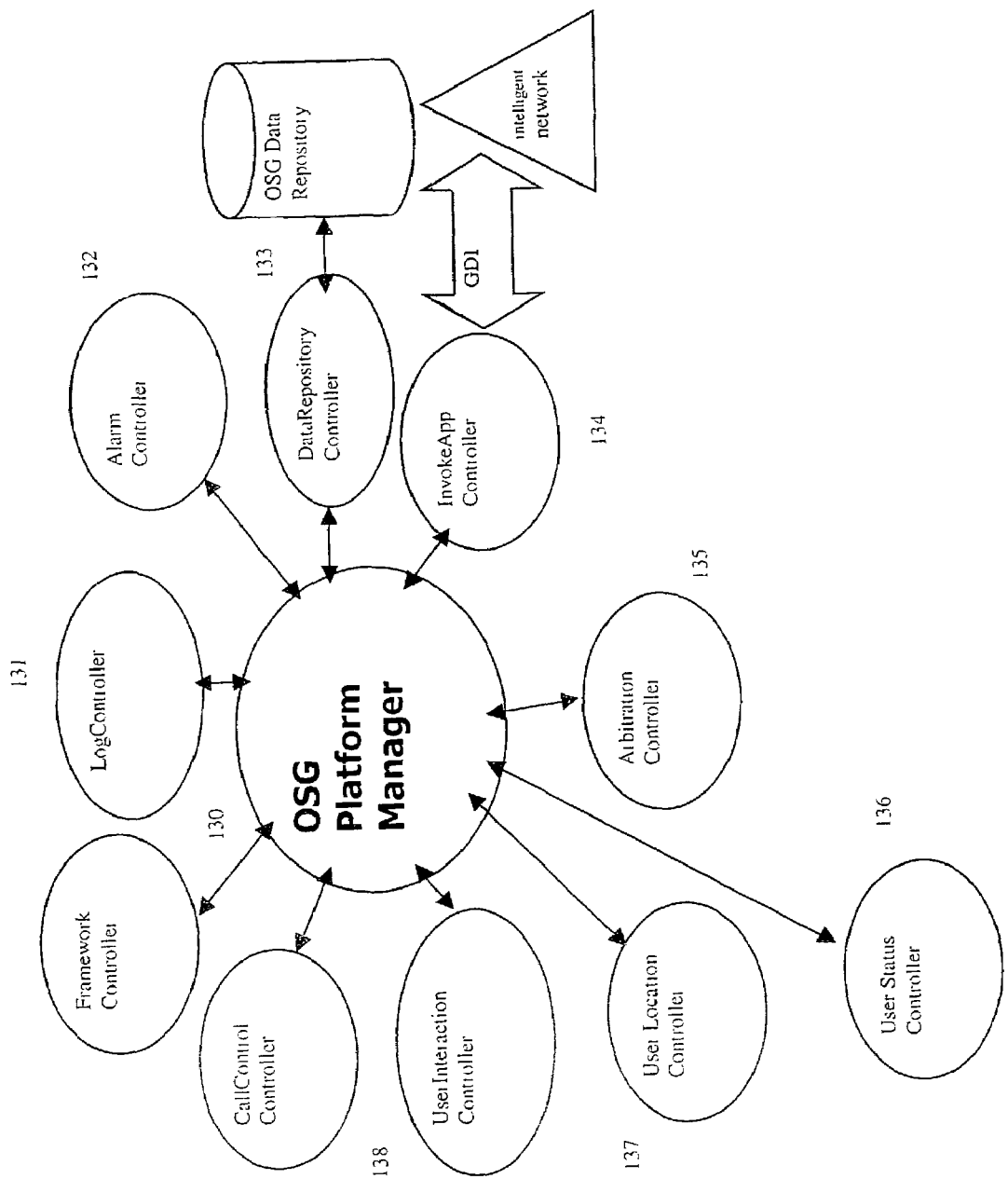
FIG. 2 depicts the architecture of the open services platform manager and its relationship to the GDI, intelligent network services control point and data repository.

As depicted by FIG. 2, the open services gateway of the present invention comprises a set of services coordinated by the Platform Manager Service. Each service is represented by a controller interface. Each service would be created with the help of associated factory interfaces. Platform Manager is responsible for loading the factories and using them to construct/create the individual controllers. Each service controller has a reference to the platform manager.

The OSG Platform Manager (OPM) 130 is the key interface that is responsible for managing the lifetimes and interaction of all other OSG components. When OSG starts up, OPG Platform Manager 130 gets created. OPM 130 loads the deployment descriptions and controls the creation and initialization of other components. When all the required systems are initialized, OPM 130 registers the available services with the Framework and announces the availability of the system by publishing the Initial Reference of OSG that a client can use. In the preferred embodiment there would be a registration with the Naming service for publishing.

OSG application logs are managed by a set of interfaces. OSG Log Controller (OLC) 131 is the interface that manages all these log related interfaces. When other OSG components require access to an application log interface, they obtain a log handle from the OSG Log Controller 131. Application components of OSG could choose to raise an alarm to flag the occurrence of abnormal/unexpected behavior of any system element. In such cases, the application components obtain an alarm handle from the OSG Alarm Controller (OAC) 132 to raise an alarm.

The OSG Data Repository (DR) 141 is an infrastructure service available to application components of OSG to store, update, retrieve and delete application data. DR 141 abstracts the details of how and where the data might be actually kept/persisted or accessed and presents a call level interface to application components. The OSG Data Repository Controller (ODRC) 133 is the managing interface for these repository roles. Any application component that is interested in repository access obtains a suitable handle from DR. The handle requested and given out could be application component specific.

The OSG InvokeApp Controller (OIC) 134 controls the communications between the OSG 100 and the intelligent network services control point 200 using the Generic Data Interface (GDI) 150. GDI 150 provides intelligent network services control point 200 with the capability to send/receive transactions to/from external systems over TCP/IP using TCAP messages. GDI supports a limited number of message types defined as part of the specifications. InvokeApp Service (IAS) abstracts a lot of protocol communication and encoding/decoding details and presents a higher layer Java API to application components, using which they could send/receive InvokeApp messages to/from intelligent network services control point. InvokeApp messages can be created using InvokeAppMessageFactory interface. OSG InvokeApp Controller 134 is the managing interface that controls IAS, InvokeAppMessageFactory and the rest of the interfaces and classes co-operating to realize the GDI InvokeApp functionality. OIC also controls the configuration details relevant to any GDI link.

In a way, the entire OSG 100 can be thought of as something that bridges the differences between two different views/representations of data and operations to achieve the same purpose. This role can be described by terms such as "translator", "bridge" or "protocol converter." The applicants prefer to use the term "arbitrator" to denote the role of the OSG 100 in the providing of network services. OSG's arbitration roles have been abstracted and managed by the OSG Arbitration Controller (OAC) 135. OAC 135 creates and distributes arbitrator interface implementations, core OSA components obtains a relevant arbitrator interface handle from OAC and use that handle to communicate with far end systems such as the intelligent network services control point.

The OSA Framework Controller (OFC) 140 is the interface that manages all the components that are associated with the Framework module of OSA specifications. OSG implements selected Framework interfaces from OSA specification as necessary to support selected functional implementations. OFC 140 would control the configurations and interrelationships of these implementations. OSG Platform Manager (OPM) 130 relies on OFC 140 to manage all the aspects that are associated with OSA framework module.

The OSA CallControl Controller (OCCC) 139 is the interface that manages the various interfaces and classes that together implement the Call Control module of OSA specifications in OSG. This interface is OSG specified, and not OSA specified.

The OSA User Interaction Controller (OUIC) 138 is the interface that manages the various interfaces and classes that together implement the User Interaction module of OSA specifications in OSG. This interface is OSG specified, and not OSA specified.

The OSA User Location Controller (OULC) 137 is the interface that manages the various interfaces and classes that together implement the User Location module of OSA specifications in OSG. This interface is OSG specified, and not OSA specified.

The OSA User Status Controller (OUSC) 136 interface that manages the various interfaces and classes that together implement the User Status module of OSA specifications in OSG. This interface is OSG specified, and not OSA specified.

OSG 100 is more of a capability to expose network element functionalities than merely a way to marshal a limited number of APIs to the intelligent network services control point 200. The design of the OSG 100 benefits from a component-based architecture. Essentially, components are units that are abstracted by interfaces and can be assembled together to build specific solutions and services. Components can be deployed using different platforms according to implementation constraints and business needs. Component implementations may be replaced, providing the component specification remains the same. Component-based frameworks not only support the cooperation of components across computer and network boundaries, they also enable the independent evolution of the components. In a nontrivial application, components do require a support infrastructure so that the component building can focus on the business core rather than implementing the infrastructure services. Also, the co-ordination of different components in an assembled application is important. Containers typically provide such infrastructure to components. Different kinds of containers address the different categories of components and optimize the parameters based on the category specific variants. The OSG system may be deployed either in an IT environment which may be geographically remote from its peer intelligent network services control point installation or locally within its peer intelligent network services control point system. It is preferred that the OSG reside on the same switched LAN or enclave as its peer intelligent network services control point installation. It is desirable to minimize the number of router hops for performance considerations.

While Application Servers play the role of such container systems for certain categories of component based Java® software, they do impose restrictions on the component models that can be supported. Presently, the application servers offer most sophisticated support for Java components conforming to Enterprise JavaBeans (EJB) Model. In the preferred embodiment the OSG 100 is to talk to intelligent network services control point 200 using GDI 150 "InvokeApp" which is a proprietary protocol from Telcordia, and hence, there has to be a means to bridge application server hosted components like EJBs and InvokeApp. While Java Connector Architecture addresses this issue in general, the support for JCA is still in its infancy. In the preferred embodiment, in the absence of a suitable and viable container that is commercially available, OSG 100 uses the OSG Platform Manager 130 as its container.

The preferred implementation of the OSG is as a Java system, with most of the components being written using only the Java programming language. This dramatically reduces the cost of porting to another operating system. In line with this driving requirement, the supporting build system shall also be OS independent. Of course, one skilled in the art would appreciate that other languages such as C, or C++ could also be used.

The user applications look at OSG as a CORBA server implementation of certain 3GPP specifications. User applications implement the client part of the specifications. The OSA core objects in OSG implement the IDL defined in the 3GPP specifications. The lifecycle of these objects will be managed by an ORB. In the preferred embodiment, Borland's VisiBroker for Java ORB is used. All ORB API access shall be through the org.omg.CORBA classes and interfaces as defined in the Java 2 API. The org.omg.CORBA.ORB class allows a plugable implementation, which means that one can install any Java ORB without changing code.

Some of the services hosted by the OSA 100 require that state data per client request be maintained. An example of such a service is the Generic Call Control service, amongst others. It is envisaged that an OSA client application may register for notification of activity of a certain subscriber and may be interested in such notifications for significant periods of time, in months or for the entire time that the subscriber is registered with that application. Thus this notification data must be persistent and relevant across multiple system failures, hardware changes etc. A reliable data store is essential.

The relational database that shall be the persistence repository for the OSA in the preferred embodiment of the invention is Oracle's Standard 8i database. The Data Repository Controller 133 would employ JDBC compliant database connection drivers to integrate the OSG framework and the database. DR 141 can choose to maintain a cache for performance objectives as long as it supports transactional ACID (Atomicity, Consistency, Isolation, Durability) behavior. DR 141 would be able to hold up to 100,000 event registrations and 1,200 active interfaces and can be restored from a backup in the event of a system failure.

The OSG 100 will have a certain number of configuration parameters. These range from the deployment descriptors of the OSG application components, to properties such as the size of certain caching pools, thread pools, database connection pools, GDI 150 connection parameters, queue sizes etc. The OSG does not simply store such data in a Java property file, which would be read at startup. This approach, which is a documented way in J2SE applications, proves to be insufficient for the following reasons. Runtime changes require a re-read of the property file, and it is not possible to know which key/value property changed, forcing the re-reading of a number of files. Also, triggering the application to re-read the property file would not be elegant, because it would require a busy-polling loop in some property reading code, or a socket approach in which a command-line tool sent a packet to a listening UDP socket, causing the application to re-read certain properties.

In a cluster of multiple OSG servers, the configuration would have to be stored on each server, unless the configuration was stored on a network mounted file system, which would then become the point of failure. Changing properties via property files requires a lot of documentation, because the location of such property files has to be precise, otherwise it will not be found by the application. Also, issues such as user permissions for file reading/writing become a concern.

The Java Management Extension (JMX) is a standard way of managing the configuration and run time properties of managed objects. OSG application components would be managed as a set of MBeans (a JMX compliant term). The OSG design shall add configuration, runtime and instrumentation Management Beans (as per the JMX requirements). These can then be programmatically managed, by remote virtual machines as well as local, and by a JMX management console. The MBeans and management console would be part of the responsibilities handled by OSG Platform Manager 130.

All components of OSG 100 are instrumented with calls to the logging system at different severity levels. The OSG 100 shall use the logging facilities provided by a third party logging API that supports categories as well as priorities/severities. This API is known as Log4Java [Log4Java] and it further supports logging messages of different severities and categories to different streams, including the UNIX system logging daemon, sockets, remote file systems, JDBC database back ends and swing consoles. The Log4J API shall be integrated into the OSG through OSG Log Controller (OLC) 131. The controller itself would be managed using JMX compliant Platform Manager units. This will allow a central configuration station to change the tracing threshold and options at runtime through the JMX change event notification mechanisms.

Initial Reference Bootstrap

The 3GPP specified interface IpInitial will have a CORBA implementation with an object lifecycle of forever (i.e. up on application start and down when application dies). This shall be hosted on each instance of the OSG server running. Each instance, as part of its initialization, shall register itself to the Visibroker Naming Service, and bind to a common name. Visibroker's naming service provides custom extensions to the standard CORBA specifications that allow more than one object reference to be bound to a single name. The URL of this naming service will then be published or made available to the OSG clients so that they can configure the clients to look the server up.

Initiate Authentication

The 3GPP specification details the IpInitial.initiateAuthentication( ) method. The arguments are as follows:
TpAuthDomain, which is a sequence of:
TpDomainID, which is a choice data type of a tagged string type, with the tags differentiating between a client application, enterprise operator, another framework, a registered service, and a service supplier. The value of the choice type is a unique string that identifies the requesting entity, and this string is available offline as well.
IpOSARef: A reference to the authentication interface. The lifecycle of this reference is supposed to be for the entire time that the TpDomainID is valid (which is valid for the time that an offline contract between the two parties is valid). This will be a reference to a TpAuthentication object.

The TpDomainID consists of a unique client ID, which is agreed upon by the OSA client application company and the OSA service provider. This would be a configurable item for OSG.

TpAuthType: A string indicating the type of authentication mechanisms requested. For OSA'99, the TpAuthentication interface is the only one that is mandated, though others of specific network providers' choice may be supplied. (valid value: P_AUTHENTICATION). The return type is the same, a reference to TpAuthDomain, which gives the unique name of the OSG gateway instance, and a reference to its authentication interface.

The authentication interface's lifecycle can be configured to be activated by an Object Activation Deamon of the ORB or to have a new instance created on every request, to save on resources as there is no context to be maintained after successful authentication.

The authentication interface, IpInitial and IpAccess, need not be implemented as a separate implementation servant per OSA client. A POA with a default servant policy for the IpInitial and IpAccess interfaces will result in the same implementation object handling client requests. The method implementations can then obtain the CORBA reference of the client interface that invoked this method. This way, one implementation object can serve all the clients. This is more efficient and conserves resources compared to an implementation that instantiates an IpInitial servant object per client.

Authentication Process

The IpInitial.initiateAuthentication( ) method obtains a reference to the IpAuthentication interface, and the following methods are invoked on it: SelectAuthMethod( ). Parameters are a comma-separated string giving the types of authentication supported (DES 56/128, RSA 512/1024 are OSA recommendations, additional ones maybe present). NULL shows that the client has no capabilities. The OSA Framework at this point has to select an authentication mechanism, and return that to the application, so that it may start the challenge/response according to the mechanism selected.

The authentication implementation is a pass through implementation, therefore there can be no CORBA INVALID_AUTHENTICATION exception, nor can the IpAppAuthentication.abortAuthentication( ) method be invoked. Applications that initiate the first method invoke with SelectAuthMethod( ) will send a NULL string so that it can be established that they have no authentication expectations. If an application does have authentication expectations, then they need to be supplied with an IpAccess reference by name via a named reference bootstrap to circumvent the authentication mechanism.

IpInitial RequestAccess

After the application has been authenticated, (which in our implementation means that every application that has contacted the OSA gets authenticated), then a method call to IpInitial.requestAccess( ) with the type of access required (for OSA it is P_ACCESS). The application provides an IpOSA reference to its IpAppAccess interface and obtains the reference to the IpAccess interface reference to the framework.

IpAccess to Obtain the Service Discovery

Having obtained an IpAccess reference, a method call to obtainInterface is invoked, with a range of framework interfaces specified, of which the OSG only supports service discovery (P_DISCOVERY). Load management, heart beat management and fault management may be supported. Signing service level agreements, and permission checking may also be supported although it may not be desired or necessary. Terminating access by the application and also by the framework is supported.

ServiceDiscovery

Listing of the service types, and description of the service types is supported, as specified by the OSA specifications.

Service Registration

This is an internal API for the CORBA server interfaces for each of the Service Capabilities to register, so that they can be advertised with the Service Discovery. Each service shall register when it is ready to accept client requests, and de-register when the service is asked to shut down. The OSG Platform Manager (OPM) 130 would control all the registration responsibilities of intelligent network services control point SCFs.

OSG 100 itself will be started up and shut down by executing commandline scripts. The startup activity would result in OSG Platform Manager 130 to be created and initialized. This would have a ripple effect of creating and initializing the OSG controller interfaces 131-140 driven by the properties specified in configuration files. The shutdown script execution will trigger the closing down of OSG Platform Manager 130 services which would involve shutting down all the OSG controller interfaces 131-140.

A deployment descriptor states whether this service is available to a specific installation of the OSA. If it is installed into the system, then on startup of OSG 100, this service is initialized. A check for the existence of client application information is done with the help of Data Repository. Table creation for storing client information such as call back references and accounting information is done before the service registers itself through the ServiceDiscovery interface.

OSA Framework Controller (OFC) 140 makes an internal method call on ServiceFactory.getServiceManager( ) and obtains an instance of a manager interface. The state to store per client is accounting information for this service, as well as unique notification number creation information.

An object-reference for the service management interface (for e.g. IpCallControlManager) is created and returned to the caller of the ServiceFactory.getServiceManager( ) method. This makes the client have a reference to its own instance of the management interface. The POA policy of these service manager interfaces maybe a default servant POA policy, if its possible to implement the interface as a stateless pass through interface, or a servant manager POA policy, for which a user-supplied object-pool can be used as a factory to reduce the numbers of instances required.

Registration with the Framework

The ServiceRegistry Framework interface is called when a specific service is ready to accept clients.

State to be Stored for All Services

Client CORBA IOR for its IpAppAccess interface. The OSA 110 shall make use of this persisted IOR obtained on client connection. In case the client application has a system crash, the IOR is invalidated, causing a CORBA exception on use, in which case a rebind is performed. Each service has applications registering to obtain certain events as they occur while users make calls or enter and leave service areas.

Figure 3:
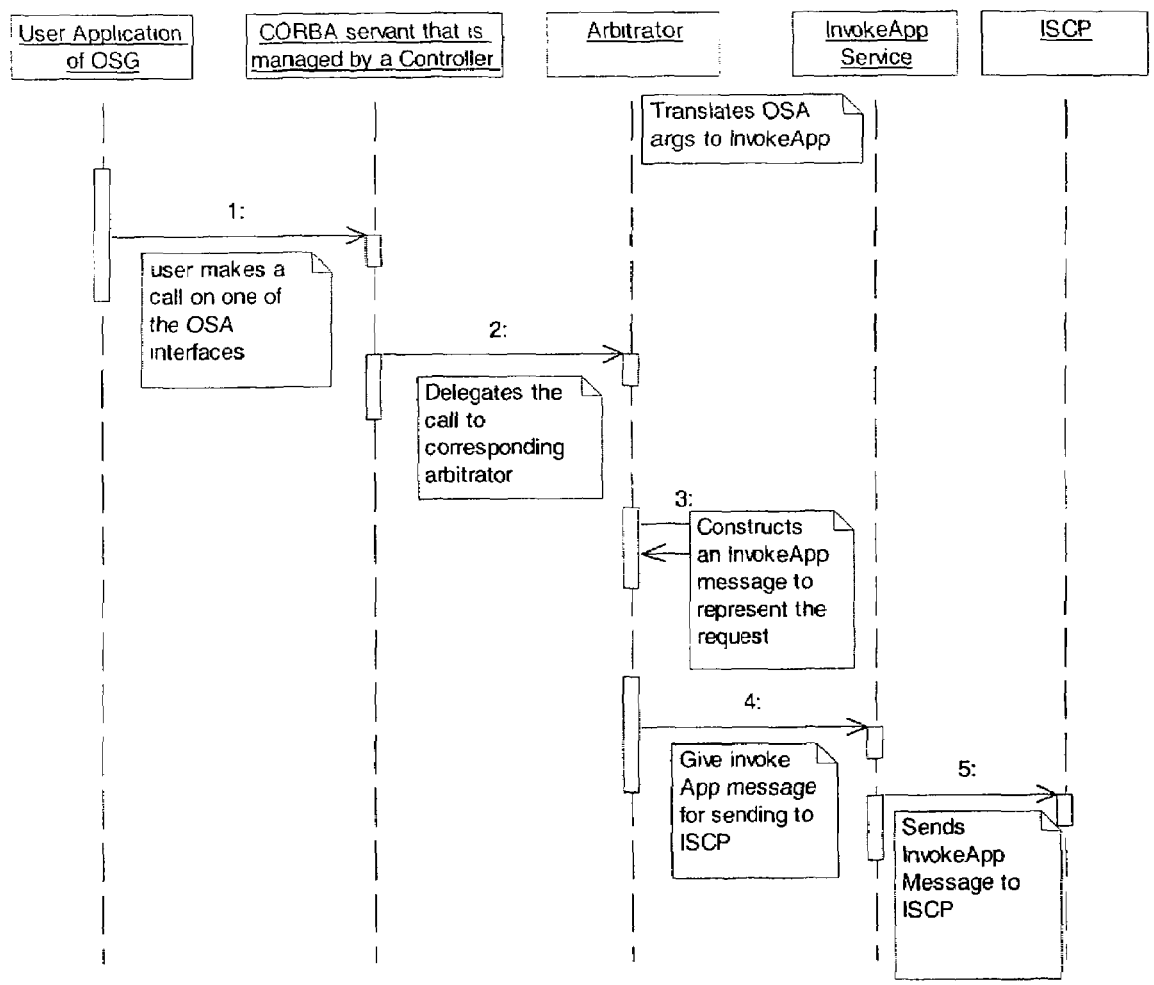
FIG. 3 depicts the traffic flow for a call originating in the OSA.
Figure 4:
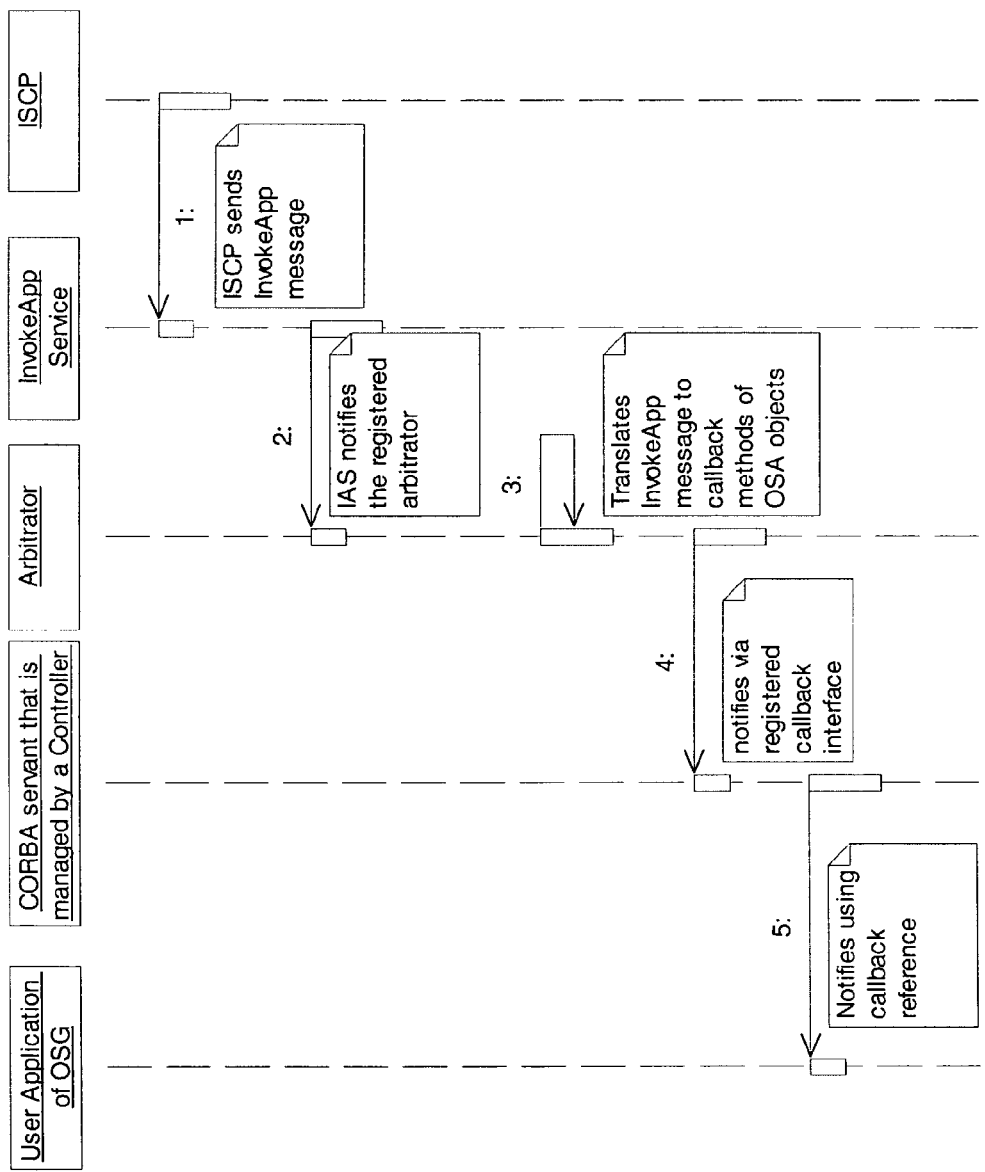
FIG. 4 depicts the traffic flow for a call originating in the intelligent network services control point.

FIGS. 3 and 4 depict the typical flow of traffic for an operation using the Open Services Gateway 100. More specifically, FIG. 3 depicts the traffic flow for a call originating from a user application. At step 501 a user makes a call on one of the OSA interfaces in OSG 100. The call arrives at a CORBA servant that is managed by the call control controller 139. The call control controller 139 delegates the call to the corresponding arbitrator at step 502. Controlled by arbitration controller 135 the arbitrator translated the arguments of the OSA to an InvokeApp command, constructs an Invoke App message to represent the call request at step 503 and then at step 504 gives the InvokeApp message to the InvokeApp Controller 134 for delivery at step 505 to the intelligent network services control point 200 via the GDI 150.

FIG. 4 depicts the traffic flow for a call originating from intelligent network services control point 200. At step 601 the intelligent network services control point 200 sends an InvokeApp message to the InvokeApp (service) Controller 134. At step 602 the InvokeApp service controller 134 notifies the registered arbitrator through arbitration controller 135. The registered arbitrator then translates the InvokeApp message to callback methods having OSA objects at step 603. At step 604 the arbitrator notifies the CORBA servant managed by the call control controller 139 via the registered callback interface. At step 605 the CORBA servant notifies the user application using the callback reference.

The CallControl service requires the registration of notifications by applications. These notifications have certain criteria, but the common criteria amongst all services are the Originating and Destination Addresses. Further criteria are service specific.

Representing a Notification Registration

The User Status and Network User Location services require registration for notifications, but apart from their service specific notification criteria, the base requirements are the user's Address. Thus there is no commonality that can be exploited for an inheritance hierarchy apart from the obvious (where the Originating Address is an only component of a common base class). The run-time representation of a notification registration should take into account that equality tests will be performed on the object at a high frequency. Thus efficient computation of object equality will lead to better performance when a notification arrives for a particular service. Because the run-time representation storage should be in a manner that is efficiently searchable, the notification objects shall be stored in a Java Collections object. Sortable collections yield to faster searching because the data is ordered with respect to a given ordering. This requires that notifications have at least a partial ordering. The notification registration class shall implement the java.util.Comparable interface.

The base class has an equals( ) implementation in line with the Sun recommendations for implementing equals. The subclasses over-ride the equals with a first call to super( ). The entire notification searching implementation is abstracted by an interface to allow for more efficient implementations to be used in subsequent versions without significant code impact because the run-time storage structures may evolve to a different storage mechanism. For the preferred implementation, a java.util.SortedMap implementation: java.util.TreeMap, which is a red-black tree implementation, shall be used.

Enable Notification

In this section, the annotation <Service> and <Manager> should be substituted with all the services and service managers that the section is relevant to, i.e. those that are interested in notifications. The clients of any of the services invoke the <Manager>.enable<Service>Notification( ) method, with certain call criteria to enable a call notification. When first invoked, a reference to the client application's peer interface, the IpApp<Service>Manager is obtained. This reference is stored as state in the Ip<Manager>Manager object if obtained by a callback, or along with the notification registration object itself, if supplied in the method (this allows for clients to short-cut the chain of requesters in case the client is a proxy to another client).

The Notification object is a Java class object that stores the state of the notification. Notification includes an identifier that uniquely identifies the client application. This identifier could be an index key to a table that stores client information, or the TpDomainID, which uniquely identifies all OSA clients. An alternative is to store the IOR of the Ip<Service>Manager interface, which would mean that all arguments of the enableCallNotificiation( ) method are persisted. Notification includes the TpAssignmentID, which is a unique number to identify this notification. The application may cancel, or change the criteria of this notification. Finally, notification includes the criteria for a call event notification have a structure specific to the service.

Notification Enabling Policy

The 3GPP specification allows TpAddressRange to have wildcard characters at the beginning or at the end of the address number. This results in one notification mapping to events being generated for multiple subscribers. The types of wildcard characters allowed are '*' and '?' which bear the same semantics as regular expressions in UNIX: '*' matches any number of characters, while '?' matches any one character.

An erroneous application can register for notifications from ALL subscribers, by registering for notifications with an address range of '*'. This would bring an OSG installation to a crawl because ALL calls will cause a message flow via the OSG to the application.

To guard against the possibility of the above happening, a configurable policy is required. Each notification is checked against this policy to guard against the problem mentioned above. The default implementation of this policy shall be described below. Another possibility of strong violation would be the use of '???' for the most significant digits of the calling/called party address. This would also result in a significant number of subscriber records being hit for a particular notification.

The number of subscribers that a registered notification's criteria can match determines how much work the OSA shall have to do for that notification. One way of attaching a weight to a notification is if the weight '0' to any notification that does not have a wild-card, and have a count of the number of '?' wild-cards present in the notification, then an idea of the number of hits that the notification would have, e.g. a number 4 would result in 10,000 subscriber addresses hitting that notification. In the presence of a fixed length of addresses, assigning a weight to the '*' wildcard would be similar, i.e. the max length—the number of bound digits would yield the number of digits that would match the '*'.

But there are no fixed length addresses, and hence, an arbitrary maximum must be assigned to calculate the weight. If a number is assigned such that the ordering still remains the same, then the arbitrary maximum need not match the most commonly occurring length of the number.

Registering Event Notifications

This section describes the manner in which the notification registrations from applications are stored in the system for efficient run-time access. First, there should be an efficient search through all the registrations. This is because every call notification that arrives, which maybe up to 10 per second (according to version one of this system) has to be matched against notification registrations that are interested in it. Second, registrations should survive failures. Applications may register for a notification only once. They shall not be expected to re-register incase of system failure. Because of this need, each registration has to be committed to persistent store (database) on registration.

A configurable property (which cannot change after startup of the OSA server) determines whether the OriginatingAddress or the DestinationAddress shall be used as key to store the registration. This is a tunable parameter and greater efficiency results if more applications are interested in specific originating addresses and OriginatingAddress is used for the key, or the same with the destination address.

The wildcard registrations are stored in an ordered list higher weighted entries being stored at the head of the list. The reason for an ordered list versus an ordered tree is as follows: If the numbering plan had a fixed address size, then the originating and destination addresses would have a fixed length. In that case, it would be possible to determine how many characters a '*' would match. It would also be possible to determine if a certain notification was mutually exclusive with respect to another. For example, if the numbering plan length was 11 characters, then '1 732 699 *' would be mutually exclusive to '* 829 8310', meaning that a call notification would not trigger both these registrations. Because there is no fixed address length, ordering the traversal of notifications such that only mutually exclusive ones get hit proves to be impossible.

If the notification does not have a wild card, then the notification is inserted into an ordered tree. This is because a non-wild card notification will not have two registrations hitting it for the criteria chosen to key on. Thus storing in an ordered tree reduces access time to the order of log(n).

Each notification run-time object shall be passed onto DataRepository, which would result in the object info being persisted to a database whenever a new notification arrived, or it was changed.

The IpCallControl manager interface is created per client upon the client invoking a ServiceFactory.getServiceManager( ) method.

The client invokes the IpCallControlManager.enableCallNotification( ) method, with certain call criteria to enable a call notification. When first invoked, a reference to the client application's peer interface, the IpAppCallManager is obtained. This reference is stored as state in the IpCallControlManager object.

The IpCallControlManager stores the state of the notification. Notification state includes an the following, in addition to the state inherited from its superclass (detailed in section 0):

TpCallEventCriteria. The criteria for a call event notification has the following structure:

DestinationAddress range and OriginationAddress. This is a structure of type TpAddressRange, which has a structure as defined by the [3GPP TS 29.198] specification. The address type of interest to the intelligent network services control point implementation of the OSA is type E164.

TpCallEventName is an integer which specifies the type of event that the notification is for (offhook, address collected, address analyzed, called party busy, called party unreachable etc.) as defined by the specifications.

Note that the incoming argument is an integer, thus the various notifications can be requested in combination, and they are logically OR'd together into a 32 bit integer. As the last notification type is 128, if a client was interested in all possible notifications, it would not exceed 255, hence only 8 bits are used.

The argument would be stored as separate Booleans. This would allow quicker searching to test weather a certain application is interested in a notification that has been generated.

TpCallNotificationType. This field indicates whether the notification is from the originating calling party or the terminating (called) party.

Change Call Notification

A DataRepository getRegisteredInterface(criteria) method is executed to find the notification state from the database and it is replaced with the new supplied notification criteria. The getRegisteredInterface( ) method has the TpAssignmentID of the old notification registration object to key its search on. The new notification criteria are updated on the data repository only if there was a previously existing entry found.

Disable Call Notification

A DataRepository removeCallNotifyRegistration( ) method is called to remove the notification registration from the set of registered notifications. The notification registration to remove is searched by TpAssignmentID as the key.

getCriteria

This operation does not provide any arguments to narrow down the set of criteria that is to be returned. Therefore, all the criteria that were enabled on behalf of the particular user application that is making this call would be returned. This requires that the application identifier be stored along with the rest of the event registration information in the data repository.

Unsupported Operations

The createCall( ) and setLoadCallControl( ) operations defined in the IDL are not supported by this version of the OSA because they are not expected to be implemented by a 1999 3GPP OSA implementation.

Call Object

When a call occurs, and the intelligent network services control point sends an InvokeApp message with the call details, a new IpCall object is created to model the call. This call object may have a default servant POA policy, which enables a single servant to handle all concurrent calls from all clients, or a user-supplied servant manager POA policy, which allows an object pool to be used as the servant implementation factory. After searching through the currently registered notifications, if a registered notification is found, then the OSA application client interested is informed of the call by passing its object reference as an argument to the Application's Call control manager interface (IpApp-CallControlManager). The method invoked by the OSA is the callEventNotify( ) method. The TpAssignmentID of the notification that the client application had registered is returned, so that the client may be able to correlate the call object with its registrations.

Route Request

The client application, upon receiving the call object request, may choose to re-route the call. This method is invoked with a set of arguments that state whether a routing report has been requested, and, optionally, the new subscriber address to which to route the application to.

DeassignCall

Invocation of this method by the OSA application purges the call object resources allocated for that call by the OSA, but it does not terminate the call, which may still be going on in the intelligent network services control point. Upon release( ), the call is handled in its normal fashion by the switch.

Setting Calling Plan and Advice of Charge

These methods may be called by an OSA application on the object reference of to the call object reference obtained for the call. All other methods are implemented as per requirements such as the setAdviceOfCharge( ) methods, and setCallChargePlan( ) methods.

Table 1 sets forth the implemented commands.

TABLE 1

| OSA API | Directionality | Related CAP2 Message |
|---|---|---|
| enableCallNotification—request call notifications be sent to the application. Includes specific event criteria to define the event notification required. | Application --> OSG | N/A—internal function. OSA saves the information pertaining to the event notification(s) for the specified address(es). Supported events include: Collected Information, Route Select Failure, Termination Attempt Authorized, Called Party Busy, Called Party No Answer. |
| changeCallNotification—change the event criteria previously set with enableCallNotification. | Application --> OSG | N/A—internal function. OSA changes information pertaining to the event notifications for the specified address(es). |
| disableCallNotification—disable the event criteria previously set with enableCallNotification. | Application --> OSG | N/A—internal function. OSA deletes information pertaining to the event notifications for the specified address(es). |
| getCriteria—retrieve the event criteria previously set with enableCallNotification. | Application --> OSG | N/A—internal function. OSA will return, the stored information pertaining to the event notifications for the specified address(es). |
| callEventNotify—notify the application of the arrival of a call related event. | OSG --> Application | InitialDP OSA creates a call object. |
| callNotificationInterrupted—notify the application that event notifications have been temporarily interrupted. | OSG --> Application | N/A—internal function. Sent to the application when the GDI links to the intelligent network services control point goes down. |
| callNotificationContinued—notify the application that event notifications have resumed. | OSG --> Application | N/A—internal function. Sent to the application when the GDI links to the intelligent network services control point are back up. |

TABLE 1-continued

| OSA API | Directionality | Related CAP2 Message |
|---|---|---|
| callAborted—notify the application that the call has been abnormally terminated. No further call interaction is allowed. | OSG --> Application | N/A—internal function. Sent to the application when an error occurs during an active call. This error may occur on the OSA. The error may also occur when the intelligent network services control point does not respond to a GDI message because the CPR was closed. OSA deletes the call object. |
| routeReq—request routing of the call to a target destination. This API includes the capability to request notification of subsequent call events. | Application --> OSG | RequestReportBCSM Supported events include: Route Select Failure, Called Party Busy, Called Party No Answer, Called Party Answer, Called Party Disconnect. Connect Continue |
| routeRes—report the request to route the call to the destination was successful and includes any information requested, e.g., called party busy. This API is invoked for each requested event report. | OSG --> Application | EventReportBCSM |
| routeErr—report the request to route the call to the destination was unsuccessful. | OSG --> Application | TCAP Return Error Or OSA/SCS internal error. |
| release—request the release of the call and the associated objects. | Application --> OSG | ReleaseCall If no call related information was requested, the OSA deletes the call object. |
| deassignCall—request the release of the call object; however, it leaves the call in progress. | Application --> OSG | Cancel (if previous events were requested) Continue (if a previous continue was not requested) The OSA deletes the call object. |
| getCallInfoReq—request information associated with the call to be provided to the application. This method must be invoked before the routeReq method. | Application --> OSG | CallInformationRequest |
| getCallInfoRes—report the time information and release reason of the finished call or call attempt. This method is sent after the routeReq method. | OSG --> Application | CallInformationReport |
| getCallInfoErr—report that the original request was erroneous | OSG --> Application | TCAP Return Error Or OSA/SCS internal error. |
| superviseCallReq—request the SCS to grant a connection time to the call and provides instructions on what to do when the time expires. | Application --> OSG | ApplyCharging |
| superviseCallRes—report a call supervision event occurred. | OSG --> Application | ApplyChargingReport |
| superviseCallErr—report that the original request was erroneous | OSG --> Application | TCAP Return Error Or OSA/SCS internal error. |
| setAdviceOfCharge—supply the charging information that will be sent to the end-users handset. | Application --> OSG | SendChargingInformation |
| setCallChargePlan—request charging information be included in network generated CDRs. | Application --> OSG | FurnishChargingInformation |
| callFaultDetected—report a network fault. | OSG --> Application | TCAP Dialogue Error The OSA deletes the call object. |
| callEnded—report that the call has terminated in the network. Call-related information may be reported after this method. The application is expected to invoke the deassignCall method once the call-related information is received. | OSG --> Application | EventReportBCSM (with event = disconnect or abandon) Any response from the network that indicates the call is no longer active, e.g., caller abandon results in this message being sent to the application. |

The following sets forth certain scenarios explaining the operation of the OSG.

Scenario 1—User Application calls 'enableCallNotification on CallControlManager. (CCM has not obtained a DataRepositoryController yet)
CCM(CallControlManager)calls
  osaCallControlController.getPlatformManager( )
CCM calls osgPlatformManager.getDataRepositoryController( )
CCM calls osgDRC.getCCMRepository( )
CCM generates assignmentID
CCM calls ccmRepository.enableCallNotify( )
CCM returns assignmentID Scenario 2—User Application calls 'enableCallNotification on CallControlManager
CCM generates assignmentID
CCM calls ccmRepository.enableCallNotify( )
CCM returns assignmentID Scenario 3—User Application calls 'disableCallNotification on CallControlManager
CCM calls ccmRepository.disableCallNotification Scenario 4—User Application calls 'changeCallNotification on CallControlManager
CCM calls ccmRepository.changeCallNotification Scenario 5—getCriteria( ) does not pass any arguments to narrow down the search.
Hence, the client application identification would be correlated to some key that helps to do a search on the datarepository for all the criteria that are registered from the same client application.

Scenario 6—intelligent network services control point sends TC_Begin InvokeApp for CallEventNotify( )
InvokeAppService calls the registered listener (an arbitrator)
CCArb calls the registered listener(CCM)
CCM starts a Transaction
CCM calls ccmRepository.getMatchingCriteria( )
CCM calls osaCCController.createCall( ) [This step would include storing callIdentifier for later use]
CCM calls appCCM.callEventNotify( )
CCM calls osaCall.setAppCallRef( )
CCM returns boolean 'true' to arb
CcArb sends +ve ack to IAS
IAS sends TC_Continue ack to intelligent network services control point Scenario 7—UserApp calls osaCall.setAdviceofCharge
  osaCall calls callArb.setAoC( )
  callArb calls IAS.sendMessage( )
  callArb waits for ack
  IAS gets the ack invokeApp from intelligent network services control point
  IAS notifies callArb
  CallArb returns the call
Scenario 8—UserApp calls osaCall.setChargePlan
  osaCall calls callArb.setChargePlan( )
  callArb calls IAS.sendMessage( )
  callArb waits for ack
  IAS gets the ack invokeApp from intelligent network services control point
  IAS notifies callArb
  CallArb returns the call
Scenario 9—UserApp calls osaCall.superviseCallReq
  osaCall calls callArb.superviseCallReq( )
  callArb calls IAS.sendMessage( )
  callArb waits for ack
  IAS gets the ack invokeApp from intelligent network services control point
  IAS notifies callArb
  CallArb returns the call(or does it? Void method??)
Scenario 10—intelligent network services control point sends TC_Continue InvokeApp for superviseCallRes
  InvokeAppService calls the registered listener (callArb)
  CallArb calls the registered listener(osaCall)
  OsaCall calls appCall.superviseRes( )
  CallArb sends +ve ack to IAS
  IAS sends TC_Continue ack to intelligent network services control point
Scenario 11—UserApp calls routeReq
  osaCall calls callArb.routeReq( )
  callArb calls IAS.sendMessage( )
  callArb waits for ack
  IAS gets ack InvokeApp from intelligent network services control point.
  IAS notifies callArb
  CallArb notifies osaCall
  OsaCall returns callLegSessionID (how to create?)
Scenario 12—intelligent network services control point sends TC_Continue InvokeApp for routeRes
  InvokeAppService calls the registered listener (callArb)
  CallArb calls the registered listener(osaCall)
  OsaCall calls appCall.routeRes( )
  CallArb sends +ve ack to IAS
  IAS sends TC_Continue ack to intelligent network services control point
Scenario 13—intelligent network services control point sends TC_Continue InvokeApp for callEnded
  InvokeAppService calls the registered listener (callArb)
  CallArb calls the registered listener(osaCall)
  OsaCall calls appCall.callEnded( )
  CallArb sends +ve ack to IAS
  IAS sends TC_Continue ack to intelligent network services control point
Scenario 14—intelligent network services control point sends TC_Continue InvokeApp for callFaultDetected
  InvokeAppService calls the registered listener (callArb)
  CallArb calls the registered listener(osaCall)
  OsaCall calls appCall. callFaultDetected ( )
  CallArb sends +ve ack to IAS
  IAS sends TC_Continue ack to intelligent network services control point
Scenario 15—UserApp calls getCallInfoReq
  osaCall calls callArb.getCallInfoReq( )
  callArb calls IAS.sendMessage( )
  callArb waits for ack
  IAS gets ack InvokeApp from intelligent network services control point.
  IAS notifies callArb
  CallArb notifies osaCall
  OsaCall waits for getCallInfoRes to come from intelligent network services control point
Scenario 16—intelligent network services control point sends TC_Continue InvokeApp for getCallInfoRes
  InvokeAppService calls the registered listener (callArb)
  CallArb calls the registered listener(osaCall)
  OsaCall calls appCall. getCallInfoRes ( )
  CallArb sends +ve ack to IAS
  IAS sends TC_Continue ack to intelligent network services control point
Scenario 17—UserApp calls release
  osaCall calls callArb.release( )
  callArb calls IAS.sendMessage( )
  callArb waits for ack
  IAS gets ack InvokeApp from intelligent network services control point
  IAS notifies callArb
  CallArb notifies osaCall
Scenario 18—UserApp calls deassignCall
  osaCall calls callArb.deassignCall( )
  callArb calls IAS.sendMessage( )
  callArb waits for ack
  IAS gets ack InvokeApp from intelligent network services control point
  IAS notifies callArb
  CallArb notifies osaCall
  OsaCall clears the workspace Call User Interaction This section presents the User Interaction Service, and addresses requirement. As described in the service startup section, the IpUIManager manager interface is created per client upon the client invoking a ServiceFactory.getServiceManager( ) method.

"Create UI Call" creates an instance of a UI Call object, and initializes state to represent either a call leg or a call, as specified in the [3GPP TS 23.127] document. A peer object called IpAppUICall is supplied by the user application.

The set of methods implemented for Call User Interaction are detailed in Table 2 below, with the network message shown alongside.

TABLE 2

| OSA API | Directionality | Related CAP2 Message |
|---|---|---|
| createUICall—request creation of a call-related user interaction object. | Application --> OSG | N/A—internal function. The OSA creates a UICall object. |
| UserInteractionAborted—report that the call has terminated abnormally and no further user interaction is allowed. | OSG --> Application | TCAP Dialogue Abort or other internal errors The OSA deletes the UICall object. |
| sendInfoReq—request an announcement be played for the specified user. This method can only be sent after a callEventNotify method has been received by the application. | Application --> OSG | To add the SRF to the call: ConnectToResource—for internal SRF EstablishTemporaryConnection—for external SRF AssistRequestInstructions—for external SRF PlayAnnouncement |

TABLE 2-continued

| OSA API | Directionality | Related CAP2 Message |
|---|---|---|
| sendInfoRes—report completion of sendInfoReq. This method is optional. | OSG --> Application | SpecializedResourceReport |
| sendInfoErr—report an error occurred and the announcement could not be played. | OSG --> Application | TCAP Return Error Or OSA/SCS internal error. |
| sendInfoAndCollectReq—request an announcement be played for the specified user and the specified number of digits collected. This method can only be sent after a callEventNotify method has been received by the application. | Application --> OSG | To add the SRF to the call: ConnectToResource—for internal SRF EstablishTemporaryConnection—for external SRF AssistRequestInstructions—for external SRF PromptAndCollectUserInformation |
| sendInfoAndCollectRes—report collected digits. | OSG --> Application | TCAP Return Result (PromptAndCollectUserInformation) |
| sendInfoAndCollectErr—report an error occurred and the announcement could not be played and/or digits could not be collected. | OSG --> Application | TCAP Return Error Or OSA/SCS internal error. |
| release—request the user interaction be released. | Application --> OSG | DisconnectForwardConnection The OSA deletes the UICall object. |
| userInteractionFaultDetected—report a fault detected in user interaction. | OSG --> Application | TCAP Dialogue Error Or call terminated or other OSA/SCS internal errors |
| abortActionReq—request a user interaction in progress be aborted. The call remains intact. | Application --> OSG | Cancel DisconnectForwardConnection |
| abortActionRes—report the abort was successful. | OSG --> Application | N/A The OSA deletes the UICall object. |
| abortActionErr—report the abort error. | OSG --> Application | TCAP Return Error Or OSA/SCS internal error. The OSA deletes the UICall object. |

The following sets forth certain scenarios explaining the operation of the OPM 130 of OSG 100 in implementing the call user interaction controller 138.

Scenario 1—UserApp calls UIManager.createUICall
  UIM calls osaCUIC.getUICall(callId)
    osaCUIC gets reference to osaCCC
    osaCUIC calls osaCCC.getCallReference(callId)
    osaCUIC calls osaUICallFactory.create(callRef)
    osaUICallFactory.create( ) calls osaCall.getArbitrator( )
    osaUICallFactory.create( ) calls osaCall.getOsgTransaction( )
    osaUIcallFactory.create sets the Arbitrator and OsgTransaction on the created osaUICall
    osaCUIC stores and returns osaUICall reference and userInteractionSessionID
Scenario 2—UserApp calls UICall.sendInfoReq
  osaUICall calls uiCallArb.sendinfoReq( )
  uiCallArb calls IAS.sendMessage( )
  uiCallArb waits for ack
  IAS gets ack InvokeApp from intelligent network services control point
  IAS notifies uiCallArb
  uiCallArb notifies osaUiCall
  osaUICall returns the assignmentID
Scenario 3—UserApp calls UICall.sendInfoAndCollectReq( )
  osaUICall calls uiCallArb.sendInfoAndCollectReq( )
  uiCallArb calls IAS.sendMessage( )
  uiCallArb waits for ack
  IAS gets ack InvokeApp from intelligent network services control point
  IAS notifies uiCallArb
  uiCallArb notifies osaUiCall
  osaUICall returns the assignmentID
Scenario 4—intelligent network services control point sends TC_Continue InvokeApp for sendInfoRes
  InvokeAppService calls the registered listener (uiCallArb)
  uiCallArb calls the registered listener(osaUICall)
  OsaUICall calls appUICall.sendInfoRes( )
  uiCallArb sends +ve ack to IAS
  IAS sends TC_Continue ack to intelligent network services control point
Scenario 5—intelligent network services control point sends TC_Continue InvokeApp for sendInfoAndCollectRes
  InvokeAppService calls the registered listener (uiCallArb)
  uiCallArb calls the registered listener(osaUICall)
  OsaUICall calls appUICall.sendInfoAndCollectRes( )
  uiCallArb sends +ve ack to IAS
  IAS sends TC_Continue ack to intelligent network services control point
Scenario 6—intelligent network services control point sends TC_Continue InvokeApp for sendInfoErr
  InvokeAppService calls the registered listener (uiCallArb)
  uiCallArb calls the registered listener(osaUICall)
  OsaUICall calls appUICall.sendInfoErr( )
  uiCallArb sends +ve ack to IAS
  IAS sends TC_Continue ack to intelligent network services control point
Scenario 7—intelligent network services control point sends TC_Continue InvokeApp for sendInfoAndCollectErr
  InvokeAppService calls the registered listener (uiCallArb)
  uiCallArb calls the registered listener(osaUICall)
  OsaUICall calls appUICall.sendInfoAndCollectErr( )
  uiCallArb sends +ve ack to IAS
  IAS sends TC_Continue ack to intelligent network services control point
Scenario 8—UserApp calls release on UICall
  osaUICall calls uiCallArb.release( )
  uiCallArb calls IAS.sendMessage( )
  uiCallArb waits for ack
  IAS gets ack InvokeApp from intelligent network services control point
  IAS notifies uiCallArb
  uiCallArb notifies osaUiCall
  osaUICall updates its state
Scenario 9—UserApp calls abortActionReq on UICall
  osaUICall calls uiCallArb.AbortActionReq( )
  uiCallArb calls IAS.sendMessage( )
  uiCallArb waits for ack
  IAS gets ack InvokeApp from intelligent network services control point
  IAS notifies uiCallArb
  uiCallArb notifies osaUiCall
  osaUICall updates its state Scenario 10—intelligent network services control point sends TC_Continue InvokeApp for userInteractionFaultDetected
  InvokeAppService calls the registered listener (uiCallArb)
  uiCallArb calls the registered listener(osaUICall)
  OsaUICall calls appUICall. userInteractionFaultDetected ( )
  uiCallArb sends +ve ack to IAS
  IAS sends TC_Continue ack to intelligent network services control point
Scenario 11—intelligent network services control point sends TC_Continue InvokeApp for abortActionRes
  InvokeAppService calls the registered listener (uiCallArb)
  uiCallArb calls the registered listener(osaUICall)
  OsaUICall calls appUICall. abortActionRes ( )
  uiCallArb sends +ve ack to IAS
  IAS sends TC_Continue ack to intelligent network services control point
Scenario 12—intelligent network services control point sends TC_Continue InvokeApp for abortActionErr
  InvokeAppService calls the registered listener (uiCallArb)
  uiCallArb calls the registered listener(osaUICall)
  OsaUICall calls appUICall. abortActionErr ( )
  uiCallArb sends +ve ack to IAS
  IAS sends TC_Continue ack to intelligent network services control point
Scenario 13—UserApp calls UIManager.enableUINotification( )
  UIM raises an exception to inform that this method is not supported
Scenario 14—UserApp calls UIManager.disableUINotification( )
  UIM raises an exception to inform that this method is not supported
Scenario 15—intelligent network services control point sends TC_Continue InvokeApp for userInteractionAborted
  InvokeAppService calls the registered listener (uiManagerArb)
  uiCallManagerArb calls the registered listener(osaUIManager)
  UIM calls appUICall. abortActionErr ( )
  uiCallArb sends +ve ack to IAS
  IAS sends TC_Continue ack to intelligent network services control point Network User Location As described in the service startup section, the IpUserLocation manager interface is created per client upon the client invoking a ServiceFactory.getServiceManager( ) method. Alternately, OGG Platform Manager 130 can choose to pre create this manager. An application invokes a Location Report Request to register interest in one or more subscribers, and gets a unique sessionID of the UI session is created by the unique number assigner algorithm. A Periodic Report Request is the same as above, except that for the set of users specified, the application requests a report to be sent to at a regular interval, specified by the reporting interval. A unique ID is returned to be able to correlate and identify this notification request. The periodic request ends when the application invokes the IpUserLocationCamel.periodicLocationReportngStop( ).

The set of methods implemented for Network User Location are detailed in the Table 3 below, with the network message shown alongside.

TABLE 3

| OSA API | Directionality | Related MAP2+ Message |
|---|---|---|
| locationReportReq—request mobile-related location information on one or more users | Application --> OSG | AnyTimeInterrogation |
| locationReportRes—deliver the requested mobile-related location information | OSG --> Application | AnyTimeInterrogation Return Result |
| locationReportErr—report the location request failed | OSG --> Application | TCAP Return Error or other internal OSA/intelligent network services control point error |
| periodicLocationReportingStart Req—request periodic mobile-related location reports on one or more users | Application --> OSG | AnyTimeInterrogation |
| periodicLocationReport—deliver the requested mobile-related location information | OSG --> Application | AnyTimeInterrogation Return Result |
| periodicLocationReportingStop Req—stop the previously requested periodic location reporting | Application --> OSG | N/A—internal function. On receipt of this method, the OSA notifies the intelligent network services control point to discontinue reporting. |
| periodicLocationReportErr—report the periodic location request failed | OSG --> Application | TCAP Return Error or other internal OSA/intelligent network services control point error |

The following sets forth certain scenarios explaining the operation of the OSG Platform Manager 130 of the OSG in implementing the network user location controller 137.
Scenario 1—User app calls UserLocationCamel.locationReportRequest
  osaULC calls ulcArb.locationReportRequest( )
  ulcArb calls IAS.sendMessage( )
  ulcArb waits for ack
  IAS gets ack InvokeApp from intelligent network services control point
  IAS notifies ulcArb
  ulcArb notifies osaULC
  osaULC returns assignmentID to UserApp
Scenario 2—User app calls UserLocationCamel.periodicLocationReportStartRequest
  osaULC calls ulcArb. PeriodicLocationReportStartRequest( )
  ulcArb calls IAS.sendMessage( )
  ulcArb waits for ack
  IAS gets ack InvokeApp from intelligent network services control point
  IAS notifies ulcArb
  ulcArb notifies osaULC
  osaULC returns assignmentID to UserApp
Scenario 3—User App calls UserLocationCamel.periodicLocationReportingStop( )
  osaULC calls ulcArb. periodicLocationReportingStop( )
  ulcArb calls IAS.sendMessage( )
  ulcArb waits for ack
  IAS gets ack InvokeApp from intelligent network services control point
  IAS notifies ulcArb
  ulcArb notifies osaULC
  osaULC returns the method UserApp Scenario 4—intelligent network services control point sends
  TC_Continue InvokeApp for LocationReportRes
  InvokeAppService calls the registered listener (ulcArb)
  ulcArb calls the registered listener(osaULC)
  OsaULC calls appULC. locationReportRes ( )
  ulcArb sends +ve ack to IAS
  IAS sends TC_Continue ack to intelligent network services control point
Scenario 5—intelligent network services control point sends
  TC_Continue InvokeApp for Location ReportRes
  InvokeAppService calls the registered listener (ulcArb)
  ulcArb calls the registered listener(osaULC)
  OsaULC calls appULC. locationReportRes ( )
  ulcArb sends +ve ack to IAS
  IAS sends TC_Continue ack to intelligent network services control point
Scenario 6—intelligent network services control point sends
  TC_Continue InvokeApp for LocationReportErr
  InvokeAppService calls the registered listener (ulcArb)
  ulcArb calls the registered listener(osaULC)
  OsaULC calls appULC. locationReportErr ( )
  ulcArb sends +ve ack to IAS
  IAS sends TC_Continue ack to intelligent network services control point
Scenario 7—intelligent network services control point sends
  TC_Continue InvokeApp for periodicLocationReportErr
  InvokeAppService calls the registered listener (ulcArb)
  ulcArb calls the registered listener(osaULC)
  OsaULC calls appULC. periodicLocationReportErr ( )
  ulcArb sends +ve ack to IAS
  IAS sends TC_Continue ack to intelligent network services control point
Scenario 8—intelligent network services control point sends
  TC_Continue InvokeApp for periodicLocation Report
  InvokeAppService calls the registered listener (ulcArb)
  ulcArb calls the registered listener(osaULC)
  OsaULC calls appULC. periodicLocationReport ( )
  ulcArb sends +ve ack to IAS
  IAS sends TC_Continue ack to intelligent network services control point
Scenario 9—User app calls UserLocationCamel.triggeredLocationReportStartRequest
  osaULC raises an exception to inform that this method is not supported
Scenario 10—User App calls UserLocationCamel.triggeredLocationReportingStop( )
  osaULC raises an exception to inform that this method is not supported.

User Status

As described in the service startup section, the IpUserStatus manager interface is created per client upon the client invoking a ServiceFactory.getServiceManager( ) method. Alternately, OPM 130 can choose to create it at startup based on deployment descriptor settings. An application can request for a report of the user status for a single user or a set of users. A unique sessionID is created and assigned to the notification so that the OSA may send it to the client when sending a report. This enables an application to correlate the report with its outstanding requests. The peer interface is used by the OSA to deliver user-status reports and errors.

The set of methods implemented for Network User Location are detailed in Table 4 below, with the network message shown alongside.

TABLE 4

| OSA API | Directionality | Related MAP2+ Messages |
| --- | --- | --- |
| statusReportReq—request the status of one or more subscribers. | Application --> OSG | AnyTimeInterrogation |
| statusReportRes—report the status of one or more subscribers. | OSG --> Application | AnyTimeInterrogation Return Result |
| statusReportErr—report the user status request failed. | OSG --> Application | TCAP Return Error or other internal OSA/ intelligent network services control point error |

The following sets forth certain scenarios explaining the operation of the OSG in implementing the user status controller 136.
Scenario 1—User app calls UserStatus.statusReportRequest
  osaUS calls usArb.locationReportRequest( )
  usArb calls IAS.sendMessage( )
  usArb waits for ack
  IAS gets ack InvokeApp from intelligent network services control point
  IAS notifies usArb
  usArb notifies osaUS
  osaUS returns assignmentID to UserApp
Scenario 2—intelligent network services control point send
  TC_CONTINUE InvokeApp for StatusReportRes
  InvokeAppService calls the registered listener (usArb)
  usArb calls the registered listener(osaUS)
  OsaUS-calls appUS. statusReportRes ( )
  usArb sends +ve ack to IAS
  IAS sends TC_Continue ack to intelligent network services control point
Scenario 3—intelligent network services control point send
  TC_CONTINUE InvokeApp for StatusReportErr
  InvokeAppService calls the registered listener (usArb)
  usArb calls the registered listener(osaUS)
  OsaUS calls appUS. statusReportErr ( )
  usArb sends +ve ack to IAS
  IAS sends TC_Continue ack to intelligent network services control point Intelligent Network Services Control Point Service Access (ISA)

Service Capability Feature (SCF) is the name 3GPP uses to denote the network functionality that is accessible to external applications. These SCFs are provided by various Service Capability Servers (SCS) like intelligent network services control point. While the OSA component 110 of the SCFs are defined by 3GPP, OSG also includes support for SCFs outside these specifications. This component of the OSG is referred to as intelligent network services control point Service Access (ISA) 120. The ISA interface is exclusively for accessing intelligent network services control point capabilities.

ISA is currently a much lower level of an API compared to OSA. It exposes the GDI subsystem and InvokeApp messages. The applications that use these APIs basically use them to make a GDI 150 connection established to intelligent network services control point 200, create InvokeApp Requests, send them to intelligent network services control point 200, and receive InvokeApp responses.

The basic interface is a JAVA API. There are some convenience Java APIs supported as part of ISA that makes the conversion of an InvokeApp message (request or response) from an XML representation to a Java object representation and vice versa. ISA also has a CORBA IDL based interface that provides the same capabilities as the ISA Java interfaces.

GDI and InvokeApp

Generic Data Interface (GDI) 150 provides the capability to send/receive transactions to/from external systems over TCP/IP using TCAP messages. GDI 150 is a service independent interface specification that allows the intelligent network services control point 200 and an external system to define the data to be exchanged for distinct services. Both sides communicate using a machine-independent data representation i.e., Basic Encoding Rules (BER).

Figure 5:
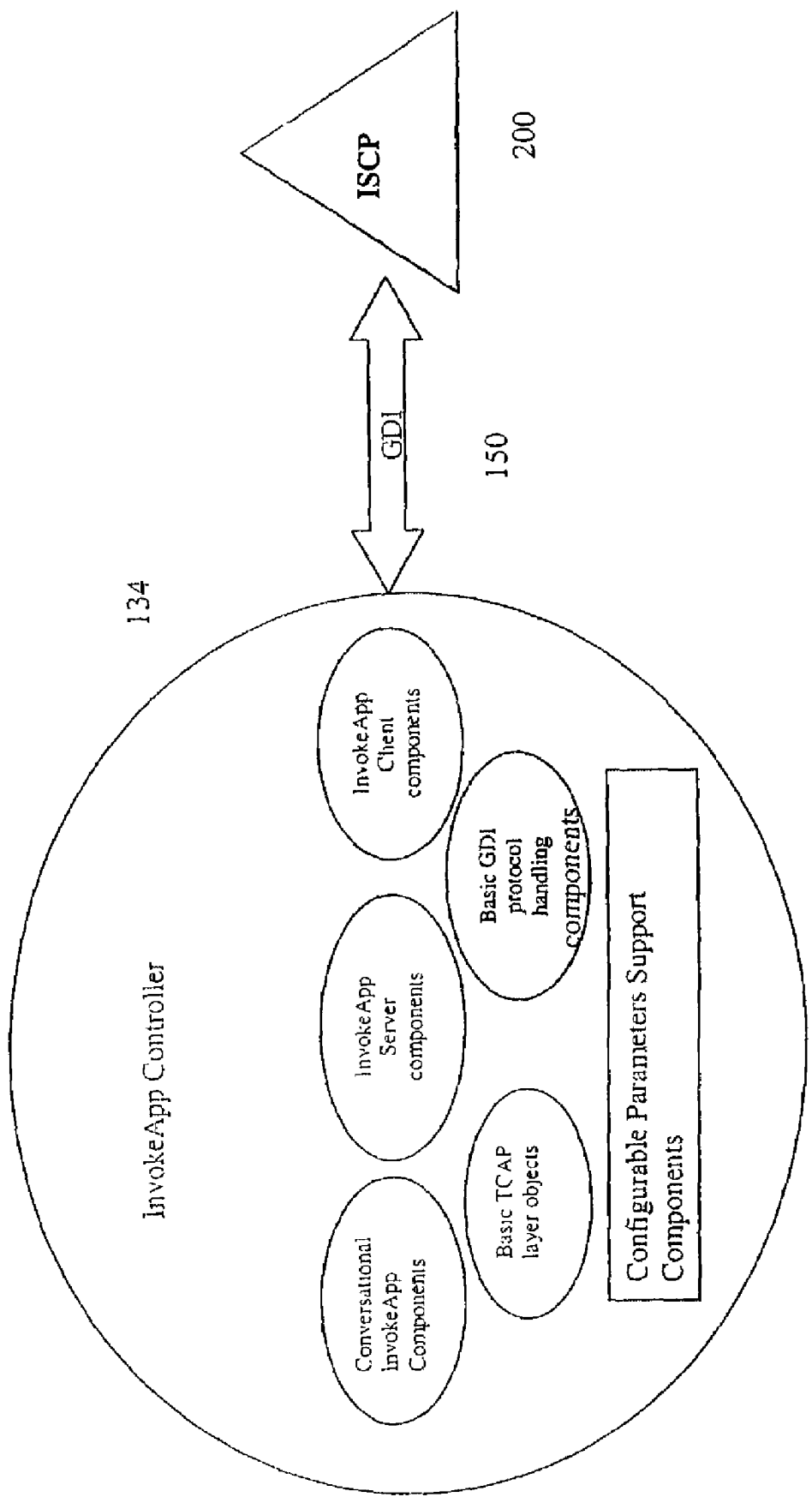
FIG. 5 depicts the components of the InvokeApp Service Controller.

InvokeApp is one of the messages that are defined over GDI 150. Logically, the side that is initiating the GDI message flow can be called the client and the side that receives the message can be called the server. Both intelligent network services control point 200 and the external system can assume either of these roles. In either case, the client requests a server to execute an application on behalf of the client and return the results. InvokeApp follows the request/response paradigm. The InvokeApp request message includes an originating system ID, an access ID, a receiver ID, an application name, an action ID, a security ID, and a set of "tagged" parameters. The InvokeApp response message includes the responding system id, the responding access id, the receiver id, the processing application name, the action id, the security id, a result type, and optionally, a set of tagged parameters. OSG 100 treats the InvokeApp subsystem as another service managed by OSG Platform Manager 130 through the OSG InvokeAppController 134. FIG. 5 depicts the components of the InvokeApp subsystem.

The InvokeApp subsystem would provide common capabilities for both the OSA 110 and ISA 120 interfaces; and uses modified InvokeAppClient (NFIAC) APIs and Trusted InvokeApp APIs (TIA). The existing InvokeApp client needs changes to support Conversational InvokeApp feature. This involves changes to its Basic (Java) and CORBA APIs . . . as well as the XML convenience interface and DTD. Additionally, GDI InvokeApp capability as a server (InvokeApp Server) needs to be added. The basic infrastructure for this feature exists in NFIAC libraries.

Interactions Across the Arbitrator—InvokeAppService Boundary.

While GDI InvokeApp, is interface of choice with intelligent network services control point in the preferred embodiments, it would also be possible to use other interface options. Hence, the OSA Core business objects are decoupled from the specifics of the mechanisms employed to communicate with intelligent network services control point 200 using the Arbitrator service of the OSG 100 as implemented by the Arbitration Controller 135 of the OSG Platform Manager 130. With this, the core business interfaces could continue to be used even if a situation emerges where the backend system is not an intelligent network services control point. In such a case, the configuration settings could be changed to instruct the business objects to redirect the flow through a different arbitrator interface and that arbitrator implementation can do the interfacing with the relevant far end system using the appropriate protocol handlers.

The arbitrator interacts with far end capability systems (intelligent network services control point, for example) under two modes. The first mode is when the request is initiated from the core business components/objects. The second mode is when the far end system initiates a request to the OSG business components. The OSA invokes methods with OSA specific arguments and the Arbitrator composes the InvokeApp messages.

InvokeAppClient Components are the components that facilitate sending InvokeApp request messages from an external system to intelligent network services control point 200. These components are the same as ISA system components as discussed herein. InvokeAppServer components are the components that facilitate receiving invokeApp request messages from intelligent network services control point. Common Components for GDI/InvokeApp are the components that are used both in InvokeAppClient and InvokeAppServer components. These are essentially GDI protocol handling entities. These include the Transport Related components as well as Encoding/Decoding components. Some of these common components are discussed below.

The ServerEndPoint interface defines a set of methods for managing ServerSockets. Using this interface, any application component can register listeners that will be notified when a connection request to the underlying ServerSocket is received. GDITransport manages the ServerEndPoint on a specified port and the InvokeAppClientHandler registers a ClientListener with the ServerEndPoint.

ServeEndPoint Public Operations are:

1.1.1.1.1.1 setClientListener (cl: ClientListener): void

Sets the specified client listener to receive client events from this ServerEndPoint. Client events occur when a connection request is received by this ServerEndPoint.

1.1.1.1.1.2 startListening ( ): void

Starts a thread that listens for connection requests on this ServerEndPoint.

1.1.1.1.1.3 getPortNumber ( ): int

Returns the port number that this ServerEndPoint is listening on.

1.1.1.1.1.4 close ( ): void

Closes the ServerEndPoint (and the underlying ServerSocket).

The EndPoint interface contains a set of methods for communicating with an InvokeApp-Server. When the GDITransport's ServerEndPoint receives a connection request from an InvokeApp Server, a socket is opened between the InvokeApp Client and Server. The GDITransport object creates an EndPoint representing the InvokeApp Client side of that socket. The interested higher-level application component (InvokeAppClientHandler/InvokeAppServerHandler)registers as a ClientListener and is notified when an EndPoint is created. The higher-level application component uses the EndPoint to communicate with the InvokeApp Server. When intelligent network services control point Resource Adapter (IRA) has to function as InvokeApp server, EndPoint is used to abstract an established connection to an InvokeApp client.

EndPoint Public Operations:

1.1.1.1.1.5 writeDataMsg (msg: byte[]): void

Sends a message to the InvokeApp Server. The message must be a BER encoded byte stream. Throws an IOException if an error occurs while writing the message.

1.1.1.1.1.6 readDataMsg ( ): byte[]

Receive a message from the InvokeApp Server. Returns a BER encoded byte stream. Throws an IOException if an error occurs while reading a message.

1.1.1.1.1.7 setBAListener (baListener: TransportBAListener): void
   Sets the specified transport byte array listener to receive transport byte array events from this EndPoint. Transport byte array events occur when a message is received by this EndPoint.
1.1.1.1.1.8 removeBAListener ( ): void
   Removes the current transport byte array listener from this EndPoint.
1.1.1.1.1.9 startReading ( ): void
   Starts a thread which reads messages from the Server on this EndPoint
1.1.1.1.1.10 getRemoteAddress ( ): TCPAddress
   Gets the TCPAddress (IP address and port number) that this EndPoint is reading/writing from/to.
1.1.1.1.1.11 close ( ): void
   Closes this EndPoint.

GDITransport defines the interface between the InvokeAppClientHandler and the InvokeApp Server. This interface defines methods to connect to an InvokeApp Server and to get a connection EndPoint. The EndPoint is used to read/write data from/to the InvokeApp Server.

GDITransport Public Operations are:
1.1.1.1.1.12 createServerEndPoint (port: int): ServerEndPoint
   This method creates a ServerEndPoint on this machine using the port specified. Returns the newly created ServerEndPoint.
1.1.1.1.1.13 getServerEndPoint (port: int): ServerEndPoint
   This method gets a reference to the ServerEndPoint attached to the specified port on this machine.
1.1.1.1.1.14 init ( ): void throws Exception
   This method initializes the GDITransport object. This method must be called before using the object. An Exception is thrown if an error occurs during initialization.
1.1.1.1.1.15 destroy ( ): void
   Called to notify this GDITransport object that it is being reclaimed and that it should destroy any resources it has allocated.
1.1.1.1.1.16 Which one( ): GDITransport
   Which is a static inner class of GDITransport. It has a single method, one, that is used to get an implementation of the GDITransport interface.

ClientListener defines a listener for client connection events. The current intelligent network services control point implementation of GDI InvokeApp protocol requires the InvokeApp Server to initiate the connection to the InvokeApp Client. (This is contrary to typical client/server interaction.) ClientListener's are notified when the Server makes the connection.

Client Listener Public Operations are:
1.1.1.1.1.17 clientConnected (ep: EndPoint): void
   Invoked when the InvokeApp Server makes a connection to the GDITransport object. The EndPoint is the EndPoint that the InvokeAppClient will use to communicate with the InvokeApp Server.

MsgEvent is the interface that will be implemented by classes that abstract a GDI InvokeApp message. Hence, both InvokeAppMsg and InvokeAppError implement this interface.

InvokeAppMsg

The InvokeAppMsg class represents a GDI InvokeApp message. This could be either an InvokeApp request or an InvokeApp response. The requestMsg data member determines whether the object is a response or request.

InvokeAppMsg private attributes are set forth in Table 5.

TABLE 5

| | |
|---|---|
| accessID: String | Identifies the sending client process, e.g. intelligent network services control point. Used to distinguish different software systems at the same site. |
| actionID: Object | Identifies the type of requested action, e.g. update a customer record. The ASN.1 definition of the InvokeApp message shows the ActionID as a choice field. The getActionIDType() class indicates which of the 3 choices a particular instance contains. |
| ApplicationName: Object | Identifies the receiving process that deals with the message. Because the ApplicationName is a ASN.1 CHOICE between String, Integer and BCDigit, this member is an Object reference. getAppNameType() gives the choice of the 3 types. |
| securityID: Object | Contains either a pin number or a user identifier, and allows the action requested to be completed or rejected depending on the verification of this. See Also: SR-5202 intelligent network services control point GDI Specification for TCP/IP, page 4-7. |
| originatingSystemID: String | Identifies the specific client site sending the message, e.g. CLLI code. |
| receiverID: String | Identifies the server software system receiving the message. |
| requestMsg: boolean | Indicates if this message is a InvokeAppRequestMessage or an InvokeApp response message. true if request message. |

Client Listener Public Operations are:
1.1.1.1.1.18 getMsgCorrelation ( ): MsgCorrelation
   Returns the MsgCorrelation for this message
1.1.1.1.1.19 containsParam (key: integer): boolean
   Tests if the specified integer is a tag to a parameter.
1.1.1.1.1.20 getParam (key: integer): Object
   Returns the parameter value to which the specified integer tag refers.
1.1.1.1.1.21 remove (key: integer): Object
   Removes a parameter tag-value pair whose tag is equal to key from this table of parameters. Does nothing if the specified tag does not exist.
   Returns the value of the specified parameter that was removed or null if the tag does not exist.
1.1.1.1.1.22 removeAll ( ): void
   Removes all parameters.
1.1.1.1.1.23 numOfParams ( ): integer
   Returns the size of the parameter list.
1.1.1.1.1.24 paramIterator ( ): java.util.Iterator
   Returns a set view of the IA parameters contained in this message.
1.1.1.1.1.25 sortedParamIterator ( ): java.util.Iterator
1.1.1.1.1.26 getActionIDType ( ): ActionIDChoice
   Identifies which choice, from the ones enumerated in ActionIDChoice, this particular instance of the message holds for the actionID field. This method can be used when it is necessary to know what type is held in the actionID field, such as on a received message.
1.1.1.1.1.27 getAppNameType ( ): AppNameChoice
   Identifies which type, from the ones enumerated in AppNameChoice the applicationName member is referencing. This method can be used when it is necessary to know what type is held in the applicationName field, such as on a received message.

1.1.1.1.1.28 getParamType (key: int): ElementDataChoice
Gets the type of the parameter for the parameter with the specified key tag. Returns an instance of ElementDataChoice describing what type this particular parameter is; null if this key is not an existing tag.

1.1.1.1.1.29 getSecurityIDType ( ): SecurityIDChoice
Identifies which choice, from the ones enumerated in securityID this particular instance holds for the securityID. This method can be used when it is necessary to know what type is held in the securityID field, such as on a received message.

1.1.1.1.1.30 isSecurityIDSet ( ): boolean
Tests if the security identifier is set.

1.1.1.1.1.31 put (key: int, value: com.telcordia.iscp.inap.ansi.types.AINDigits): Object
Inserts or replaces a parameter with the specified tag. Key is the parameter tag key and value is the new or replacement parameter value. Returns the previous parameter value if this is a replacement, otherwise null.

1.1.1.1.1.32 put (key: int, value: byte[]): Object
Inserts or replaces a parameter with the specified tag. Key is the parameter tag key and value is the new or replacement parameter value (a byte array that represents a MSAP Hex String). Returns the previous parameter value if this is a replacement, otherwise null.

1.1.1.1.1.33 put (key: int, value: java.lang.Boolean): Object
Inserts or replaces a parameter with the specified tag. Key is the parameter tag key and value is the new or replacement parameter value (a boolean value). Returns the previous parameter value if this is a replacement, otherwise null.

1.1.1.1.1.34 put (key: int, value: com.telcordia.iscp.inap-.types.BCDString): Object
Inserts or replaces a parameter with the specified tag. Key is the parameter tag key and value is the new or replacement parameter value (a BCDString). Returns the previous parameter value if this is a replacement, otherwise null.

1.1.1.1.1.35 put (key: int, value: ElementErrorType): Object
Inserts or replaces a parameter with the specified tag. Key is the parameter tag key and value is the new or replacement parameter value (an instance of ElementErrorType). Returns the previous parameter value if this is a replacement, otherwise null. The parameter describes error conditions.

1.1.1.1.1.36 put (key: int, value: java.lang.Integer): Object
Inserts or replaces a parameter with the specified tag. Key is the parameter tag key and value is the new or replacement parameter value. Returns the previous parameter value if this is a replacement, otherwise null.

1.1.1.1.1.37 put (key: int, value: java.lang.Double): Object
Inserts or replaces a parameter with the specified tag. Key is the parameter tag key and value is the new or replacement parameter value. Returns the previous parameter value if this is a replacement, otherwise null.

1.1.1.1.1.38 put (key: int, value: java.lang.String): Object
Inserts or replaces a parameter with the specified tag. Key is the parameter tag key and value is the new or replacement parameter value. Returns the previous parameter value if this is a replacement, otherwise null.

MsgCorrelation contains the TCAP TransactionID and componentID for each message. This is used to correlate a request message with its response. Package level constructor ensures that client developed code cannot create an Invoke AppMsg instance with a MsgCorrelation that is not valid. The public operations of MSGCorrelation are:

1.1.1.1.1.39 getTransactionID ( ): String 1.1.1.1.1.40 getComponentID ( ): String
Returns the componentID (for ANSI) or invokeID (for ITU).

1.1.1.1.1.41 equals (another: Object): boolean 1.1.1.1.1.42 clone ( ): Object
Returns a shallow copy of this MsgCorrelation instance.

InvokeAppError class encapsulates the error response that is received from InvokeApp server corresponding to an InvokeApp request that was sent by the InvokeAppClient.

MsgCodec is the interface that let the InvokeAppMsg objects (requests, or responses) to be encoded. As per the InvokeApp specifications, this encoding is done on the Basic Encoding Rules (BER). MsgCodec also provides the interface to get a BER encoded byte stream to be decoded to a InvokeAppMsg.

The public operations of MsgCodec are:

1.1.1.1.1.43 init ( ): void 1.1.1.1.1.44 encode (m: MsgEvent): byte[]
Accepts an InvokeApp request (an instance of InvokeAppMsg which implements MsgEvent) and returns an encoded byte array. This is the wire level data that is sent to the InvokeApp Server over GDI connection.

1.1.1.1.1.45 decode (ba: byte[]): MsgEvent
Accepts a byte array (presumably, BER encoded) and returns an instance of a class that implements MsgEvent interface. Currently, the possibilities are InvokeAppMsg object or InvokeAppError object to be returned.

1.1.1.1.1.46 destroy ( ): void

CodecNotFoundException is an inner class of MsgCodec. It is thrown when the InvokeAppClient tries to get a MsgCodec using the MsgCode.Which.codec method and the get fails.

MsgCodecInitException is an inner class of MsgCodec. It is thrown if there are any problems loading the MsgCodec in the static initialization block of the MsgCodec.Which inner class.

MsgCodec.Which is a static inner class in MsgCodec interface. It is used to get an implementation of the MsgCodec interface. The public operations of it are:

1.1.1.1.1.47 codec(msgClass:Class): MsgCodec throws MsgCodec.CodecNotFoundException
This is a static method used to get an implementation of the MsgCodec interface. It throws CodecNotFoundException if an implementation cannot be found.

EncodeDispatch is responsible for creating and maintaining a threadpool as well as a Runnable Object pool for encoding a message from a MsgEvent object to a byte array. The destination of the byte array is specified by a Delivery implementation. The public operations are:

1.1.1.1.1.48 EncodeDispatch(MsgCodec c, EncodeDispatch.Delivery d, int maxThreads, int maxRunnables, boolean fullPolicy)

1.1.1.1.1.49 encode(MsgEvent msg): void
Note that this encode method doesn't return the encoded byte array directly. The byte array is delivered to the destination based on the Delivery implementation.

Decode dispatch is responsible for creating and maintaining a threadpool as well as a Runnable Object pool for decoding a byte array to a MsgEvent object. The destination of the MsgEvent is specified by a Delivery implementation. Its public operations are:

1.1.1.1.1.50 DecodeDispatch(MsgCodec c, EncodeDispatch.Delivery d, int maxThreads, int maxRunnables, boolean fullPolicy)

1.1.1.1.1.51 decode(byte[] ba): void

Schedule byte array for decoding by specified decoder, and after the decoding is complete, place the deliver message according to the delivery method specified ChoiceEnumeration is an abstract class to support type-safe enumerated types. Various subclasses give the actual enumerated types. A higher overhead compared to having an interface with public member integers, but provides type checking and guards against incorrect value assignment. The subclass needs to be final, and its members which are enumerated choices should be final as well.

ASN1Choice supports ASN notation choices which have a name, a choice value, and also an ASN tag value. This class adds the tag value member to an enumerated choice object. The value will be set automatically using an incrementing static variable. This variable will need to be reset after every subclass has finished its static initialization.

IAErrorChoice is an enumerated type for the InvokeAppError message which can be returned by the intelligent network services control point and may contain the values generalFailure:IAErrorChoice, missingCustomerRecord:IAErrorChoice, dataUnavailable:IAErrorChoice, taskRefused:IAErrorChoice, queFull:IAErrorChoice, timerExpired:IAErrorChoice, systemNotResponding:IAErrorChoice or unauthorizedRequest:IAErrorChoice.

ElementDataChoice is an enumerated type for the ElementData CHOICE member within the InvokeAppData type. A set of InvokeAppData elements make an InvokeAppReq object. The ElemDataChoice identifies which of several types an InvokeAppData element holds selected from the following choices: elemAINDigits, elemBoolean, elemDigits, elemErrorIdentifier, elemIA5String, elemInteger, elemReal, and elemString.

SecurityIDChoice is an enumerated type for the SecurityIdentifier CHOICE field within the InvokeApp message. The InvokeAppMsg class contains a member of this type which indicates which choice has been taken for a particular instance of the message. The values for each enumeration denote the ASN tag values for each. The enumerated values are assigned by the superclass constructor and are the following. pin:SecurityIDChoice, userID:SecurityIDChoice, byTags:HashMap.

ActionIDChoice is an enumerated type for the ActionID CHOICE member within the InvokeApp message. The InvokeAppMsg class contains a member of this type which indicates the choice taken for a particular instance of the message. The type selections are: actionString, actionInteger, actionDigits and by Tags:HashMap.

AppNameChoice is an enumerated type having one of the following values: appNameString, appNameInteger, appNameDigits or by: Tags:HashMap.

ElementErrorType is an enumerated type for the InvokeApp message. The InvokeApp message contains the InvokeAppReq/InvokeAppResp section, which is a sequence of ElementData objects. An ElementData object may contain an ElementError. Note that the enumeration values do not increase sequentially, but correspond to the values in the InvokeApp Specification: general Failure:ElementErrorType, missingCustomerRecord:ElementErrorType, dataUnavailable:ElementErrorType, taskRefused:ElementErrorType, queFull:ElementErrorType, timerExpired:ElementErrorType, systemNotResponding:ElementErrorType or unauthorizedRequest:ElementErrorType.

The TCAP type would be read from a configuration repository/file to determine appropriate encoding scheme. This configuration would be applicable across the entire set interfaces supported from the particular OSG installation in question. In other words, one can configure OSG to use the TCAP type by setting the configuration parameter 'TCAP_TYPE' with either a value 'ITU' or the legal alternate value 'ANSI'; and all the OSG processing would abide by that configuration.

There are configurable InvokeApp Message Parameters, of which the default values associated with the following message fields would be managed in a configuration repository.

Originating System ID
AccessID
ReceiverID
Security PIN

The values managed by this repository would be updateable by system administrator. These values would be used by a factory that creates InvokeAppMessage objects. However, the user applications(Arbitrator interfaces, in OSG architecture) can override these default values. Whether this overriding is allowed or not will be another configurable policy parameter maintained by OSG.

GdiLinkManager manages all the GDI 150 links to intelligent network services control point 200 and takes care of maintaining TCP/IP connections to all nodes in the intelligent network services control point mated-pair configuration. This class also takes care of distributing the GDI 150 traffic among the available links at any point of time. However, the conversational InvokeApp service requires that all InvokeApp messages of a dialog share the same GDI link. GdiLinkManager will not be responsible for ensuring this. Other components of InvokeApp service would have to ensure that all messages of a dialogue go through the same link.

There are more conversational InvokeApp related modifications on codec layer. Also, the InvokeAppMsg would have both OriginatingTransactionID and DestinationTransactionID. Additionally, the user application would have to specify whether the message is to be sent as a TC_BEGIN or a TC_CONTINUE or a TC_END message type.

Arbitrator Components

ISCPArbitrator is a term that could be used to abstract any kind of mechanism to communicate with intelligent network services control point. Since the mechanism currently is GDI InvokeApp, the present set of Arbitrator components would be targeting a GDI InvokeApp route to get network functionality. The deployment descriptors for arbitrator interfaces would provide one layer of GDI configuration data. This includes: GDI authentication parameters, e.g., intelligent network services control point system name, access identifier, PIN; TCAP type (ANSI or ITU); and, Application Identifier [SSN of intelligent network services control point CAMEL feature set]. Another option is to treat these parameters as management attributes controlled using Java Management Extensions (JMX) and Mbeans.

The basic layers of OSG, namely, CORE OSA objects, Arbitration Objects and InvokeApp Service objects use a mix of synchronous and asynchronous means to communicate with each other. This is because the communication between OSG and intelligent network services control point using GDI is partially asynchronous.

Arbitrator accepts requests from OSA CORE objects (e.g., Call object) and translates the request arguments to an InvokeApp message (with the help of InvokeAppMessageFactory) and sends the message to intelligent network services control point using InvokeAppService object. Intelligent network services control point sends an acknowledgement for receiving the request. This acknowledgement is received by InvokeAppService and it notifies the arbitrator of the same. The arbitrator can notify the OSA CORE object if required. But the transaction is not over yet. Intelligent network services control point might send another InvokeApp message with the same transaction Ids to OSG. That message would have to be processed by the OSA CORE object in the same transaction context. This requires that the OSA CORE objects and arbitrator objects be transaction aware. The interface OsgTransaction is the abstraction of OSA CORE object's view of a transaction. Along with each method call/callback (between OSA CORE objects and Arbitrator), an object that implements OsgTransaction would be passed as an argument.

Now, the Arbitrators that map messages to/from InvokeApp conformant messages would have to have transaction Ids (Both OriginatingTransID as well as DestinationTransID) that obey GDI rules. For this purpose, we have another interface, OsgInvokeAppTransactionContext, which is basically the abstraction of Arbitrator's view of the transaction. This interface has a reference to OsgTransaction interface, so that the arbitrator can map one to another.

State Management

OSA SCFs and associated interfaces are state aware. Operations yield different results depending on the state of the interface. This design proposes to use State Design Pattern for state management. osaCallControlManager has a reference to the current State object. Any state dependant calls that are made on osaCallControlManager is delegated to the State object. OsaCallControlManager acts more like a proxy for these calls.

The alternate approach is to have a 'switch(stateVariable)' and 'case' sort of branching to account for the state dependent behavior. However, the state pattern based approach makes state management more cleanly structured and maintainable.

When any component needs data access services, it obtains appropriate data handle from DataRepositoryController. The DataHandle obtained would support specific data access operations needed. DataRepositoyService (The DataRepositoryController and various DataHandle interfaces, when implemented) abstracts the details of storing and retrieving data from CORE OSA objects.

Figure 6:
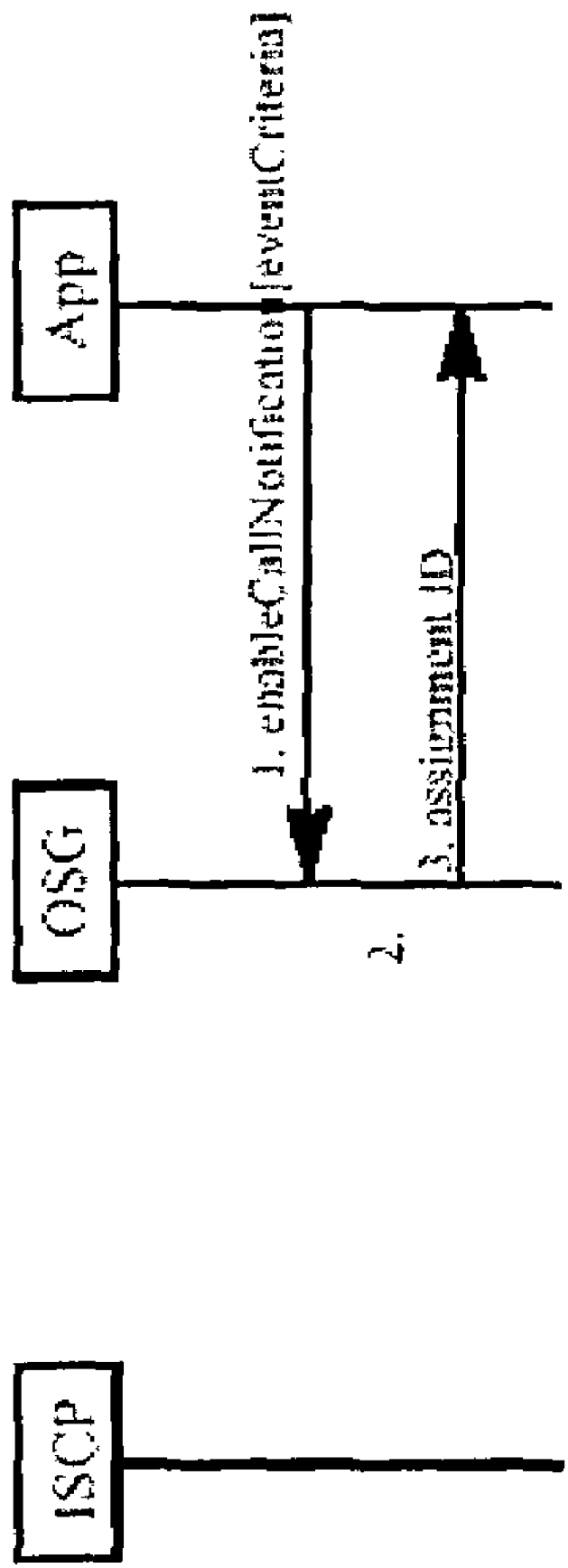
FIG. 6 depicts the process flow of an application requesting to be notified of call related events.

FIG. 6 describes how an application requests to be notified of call related events, e.g., collected information event, called party busy event, etc. Three other functions, changeCallNotification, disableCallNotification, and getCriteria, not shown here, are also supported and follow the same call flow. These functions are used to change the event criteria, disable the call notification for the particular address, and to retrieve the currently set event criteria.

In FIG. 6 the following steps are taken:
1. The application invokes the OSA API to enable call notification for a particular address or for an address range. The API contains the particular events the application is interested in receiving.
2. The OSA sets the events for the address or address range in the data repository. Setting events is an internal function that does not result in messaging to the network.
3. The OSA returns the assignment ID to the Application.

Figure 7:
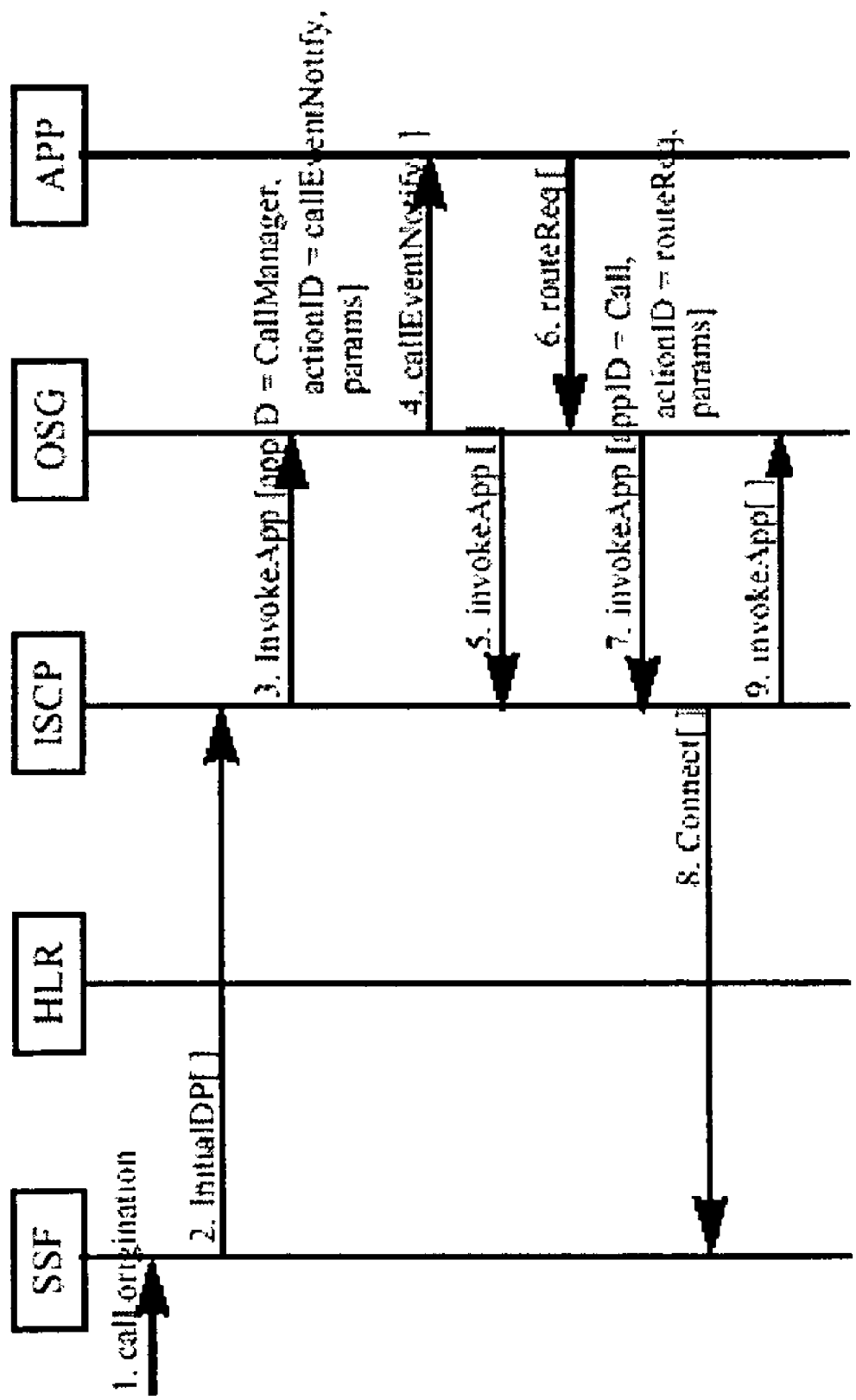
FIG. 7 depicts the process flow of a successful call notification scenario for an incoming call.

FIG. 7 describes a successful call notification scenario for an incoming call. This scenario assumes the application has previously requested notification for the specified address as set forth in FIG. 6. There is no request for subsequent call events in this call scenario.

The following steps are taken:
1. The caller dials the subscriber's number.
2. The SSF detects the CAMEL trigger and launches an InitialDP message to the intelligent network services control point.
3. The intelligent network services control point examines the ServiceKey parameter. If the ServiceKey indicates OSA processing, the intelligent network services control point sends to the OSG the call notification in an SR-5202 InvokeApp [TC_Begin] message. The message contains the application identifier (Call Manager), action identifier (callEventNotify) and the related parameters. The intelligent network services control point then waits for a subsequent InvokeApp response message from the OSG.
4. The OSG informs the application of the call notification with the callEventNotify API. The API contains the assignment identifier and the call identifier.
5. The OSG acknowledges the receipt of the call notification by sending an InvokeApp [TC_Continue] response to the intelligent network services control point.
6. The application executes the services for the particular subscriber and instructs the OSG (with the routeReq API) to connect the call.
7. The OSG sends to the intelligent network services control point the routing instructions in an SR-5202 InvokeApp [TC_Continue] request message. The message contains the application identifier (Call), action identifier (routeReq) and the related parameters.
8. On receipt of the InvokeApp [TC_Continue] response message, the intelligent network services control point sends to the SSF a Connect message and related parameters instructing the SSF to connect the call. The routeReq could also have requested the call to be continued or released.
9. The intelligent network services control point acknowledges the receipt of the Connect request with an InvokeApp [TC_End] response. Note that if an error occurred, the intelligent network services control point would indicate that here.

Figure 8:
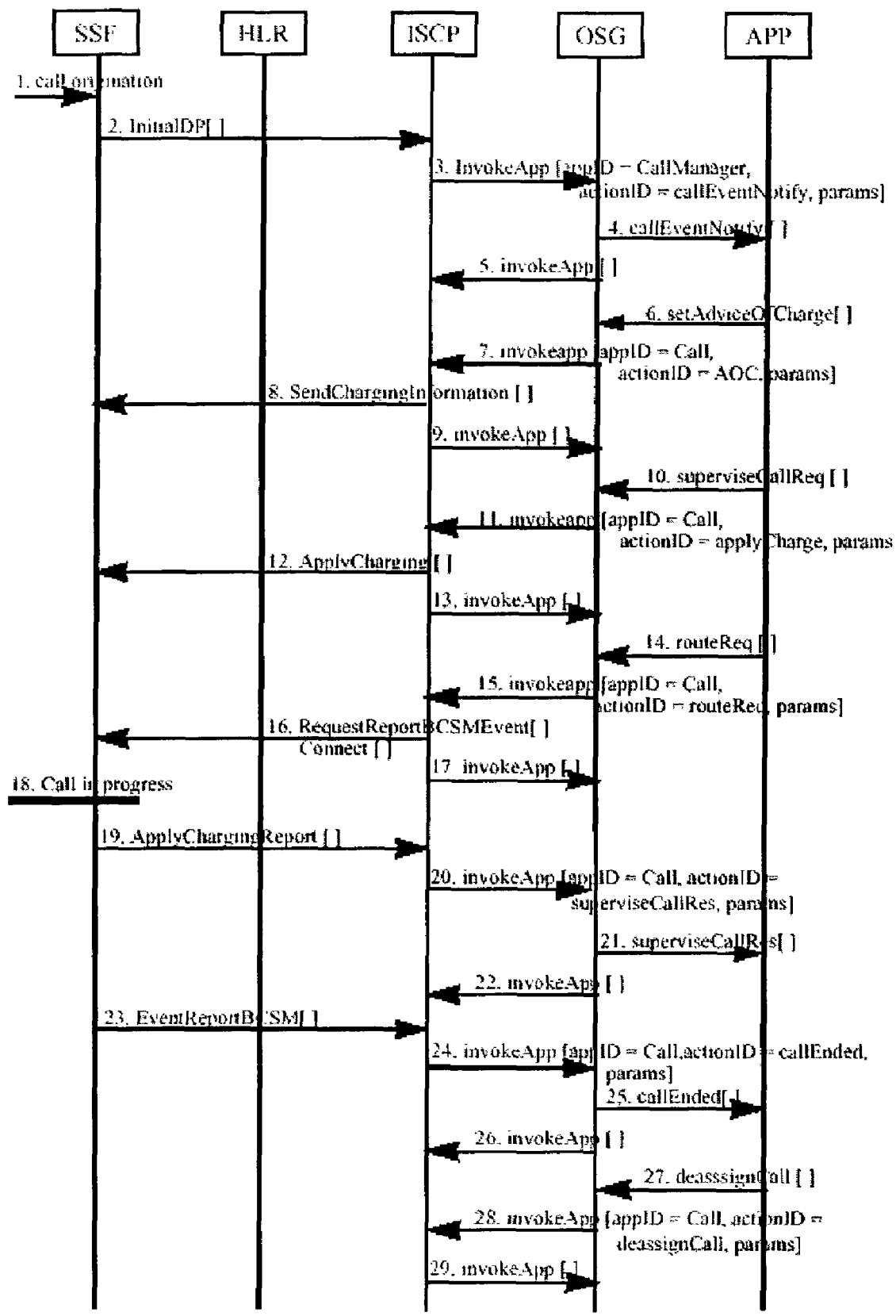
FIG. 8 depicts the process flow of a successful call notification scenario for an incoming call with subsequent event notification.

FIG. 8 describes a successful call notification scenario for an incoming call with subsequent event notification. The application requests to be notified of specified events during the call. The following steps are taken:
1. The subscriber dials a number.
2. The SSF detects the CAMEL trigger and launches an InitialDP message to the intelligent network services control point.
3. The intelligent network services control point examines the ServiceKey parameter. If the ServiceKey indicates OSA processing, the intelligent network services control point sends to the OSG the call notification in an SR-5202 InvokeApp [TC_Begin] message. The message contains the application identifier (Call Manager), action identifier (callEventNotify) and the related parameters. The intelligent network services control point then waits for a subsequent InvokeApp response message from the OSG.
4. The OSG informs the application of the call notification with the callEventNotify API. The API contains the assignment identifier and the call identifier.
5. The OSG acknowledges the receipt of the call notification by sending an InvokeApp [TC_Continue] response to the intelligent network services control point.
6. The application executes the service for the particular subscriber and sends to the OSG (with the setAdviceOf- Charge API) an indication that the application will be responsible for charging the call.

7. The OSG sends the request to the intelligent network services control point in an SR-5202 InvokeApp [TC_Continue] message. The message contains the application identifier (Call), action identifier (AdviceOfCharge) and the related parameters.
8. On receipt of the InvokeApp message, the intelligent network services control point sends to the SSF a SendChargingInformation message and related parameters to request charging information be displayed on the handset.
9. The intelligent network services control point acknowledges the receipt of the AdviceOfCharge by sending an InvokeApp [TC_Continue] response to the OSG.
10. The application sends to the OSG (with the superviseCallReq API) the allowed time for the call.
11. The OSG sends the request to the intelligent network services control point in an SR-5202 InvokeApp [TC_Continue] message. The message contains the application identifier (Call), action identifier (superviseCallReq) and the related parameters.
12. On receipt of the InvokeApp message, the intelligent network services control point sends to the SSF an ApplyCharging message and related parameters instructing the SSF to respond after the allowed time expires.
13. The intelligent network services control point acknowledges the receipt of the ApplyCharging by sending an InvokeApp [TC_Continue] response to the OSG.
14. The application instructs the OSG (with the routeReq API) to request event notification for call disconnect and to connect the call.
15. The OSG sends the request to the intelligent network services control point in an SR-5202 InvokeApp [TC_Continue] message. The message contains the application identifier (Call), action identifier (routeReq) and the related parameters, including a request for notification of a disconnect event. Since the application is requesting further call interaction, i.e., event notification, the InvokeApp message is sent in a TC_Continue package.
16. On receipt of the InvokeApp message, the intelligent network services control point sends to the SSF a Connect message with a RequestReportBCSMEvent component instructing it to connect the call and notify the intelligent network services control point when the specified event(s) occur(s).
17. The intelligent network services control point acknowledges the receipt of the RouteReq by sending an InvokeApp [TC_Continue] response to the OSG.
18. The call is in progress.
19. The allowed time for the call expires and the SSF sends an ApplyChargingReport message to the intelligent network services control point.
20. The intelligent network services control point sends to the OSG the event notification in an SR-5202 InvokeApp [TC_Continue] message. The message contains the application identifier (Call), action identifier (superviseCallRes) and the related parameters.
21. The OSG informs the application of the expired call time with the superviseCallRes API. The API contains the assignment identifier and the call identifier. Although, call supervision is shown once in this call scenario, the superviseCallReq/superviseCallResAPIs may be repeated throughout the call.
22. The OSG acknowledges the receipt of the superviseCallRes by sending an InvokeApp [TC_Continue] response to the intelligent network services control point.
23. The SSF detects the specified event (call disconnected) and notifies the intelligent network services control point with the EventReportBCSM message.
24. The intelligent network services control point sends to the OSG the event notification in an SR-5202 InvokeApp [T_Continue] message. The message contains the application identifier (Call), action identifier (callEnded) and the related parameters.
25. The OSG informs the application of the event notification with the callEnded API. The API contains the assignment identifier and the call identifier.
26. The OSG acknowledges the receipt of the callEnded by sending an InvokeApp [TC_Continue] response to the intelligent network services control point.
27. The application is not waiting for subsequent call reports and the service execution for the particular subscriber is over. The application instructs the OSG (with the deassignCall API) to de-assign the call object.
28. The OSG sends the request to the intelligent network services control point in an SR-5202 InvokeApp [TC_Continue] message. The message contains the application identifier (Call), action identifier (deassignCall) and the related parameters.
29. The intelligent network services control point acknowledges the receipt of the deassignCall by sending an InvokeApp [TC_End] response to the OSG.

Figure 9:
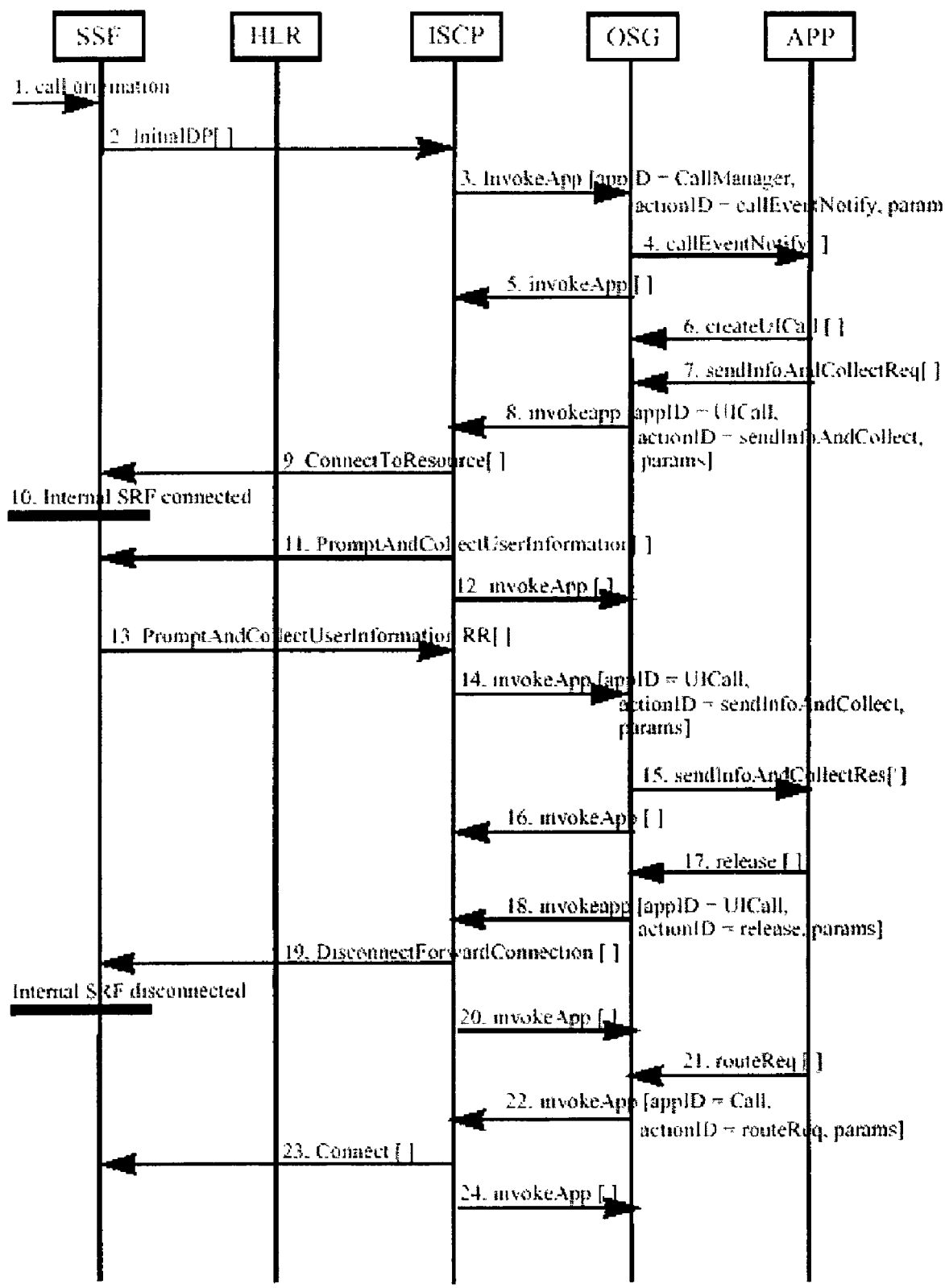
FIG. 9 depicts the process flow a successful call notification scenario with user interaction.

FIG. 9 describes a successful call notification scenario with user interaction. The call notification must have occurred before the application can request user interaction. The following steps are taken:

1. The caller dials the subscriber's number.
2. The SSF detects the CAMEL trigger and launches an InitialDP message to the intelligent network services control point.
3. The intelligent network services control point examines the ServiceKey parameter. If the ServiceKey indicates OSA processing, the intelligent network services control point sends to the OSG the call notification in an SR-5202 InvokeApp [TC_Begin] message. The message contains the application identifier (Call Manager), action identifier (callEventNotify) and the related parameters. The intelligent network services control point then waits for a subsequent InvokeApp response message from the OSG.
4. The OSG informs the application of the call notification with the callEventNotify API. The API contains the assignment identifier and the call identifier.
5. The OSG acknowledges the receipt of the call notification by sending an InvokeApp [TC_Continue] response to the intelligent network services control point.
6. The application executes the services for the particular subscriber and instructs the OSG (with the createUICall API) to create a UICall object connected with this call.
7. The application then instructs the OSG (with the sendInfoAndCollectReq API) to send an announcement to and collect digits from the calling party.
8. The OSG sends the user interaction instructions to the intelligent network services control point in an SR-5202 InvokeApp [TC_Continue] message. The message contains the application identifier (UICall), action identifier (sendInfoAndCollect) and the related parameters.
9. On receipt of the InvokeApp message, the intelligent network services control point instructs the SSF to connect the internal SRF with the ConnectToResource message and related parameters. The intelligent network services control point service logic must contain knowledge (via provisioned information) of the SRF to use. The type of SRF determines which type of connect message to use: ConnectToResource, EstablishTemporaryConnection, or AssistRequestInstructions.

10. The SSF connects the internal SRF.
11. The intelligent network services control point sends to the SSF a PromptAndCollectUserInformation message and related parameters requesting the SRF to play an announcement and collect digits.
12. The intelligent network services control point acknowledges the receipt of the sendInfoAndCollect by sending an InvokeApp [TC_Continue] response to the OSG.
13. The SSF returns to the intelligent network services control point the digits in the PromptAndCollectUserInformation Return Result message.
14. The intelligent network services control point forwards the collected digits to the OSG in an SR-5202 InvokeApp [TC_Continue] message. The message contains the application identifier (UICall), action identifier (sendInfoAndCollect) and the related parameters, including the collected digits.
15. The OSG forwards to the application the collected digits with the sendInfoAndCollectRes API. The API also contains the assignment identifier and the call identifier.
16. The OSG acknowledges the receipt of the sendInfoAndCollectRes by sending an InvokeApp [TC_Continue] response to the intelligent network services control point.
17. The application notifies the OSG (with the release API) that it is finished with call user interaction. Steps 7-16 (except for steps 9 and 10) may be repeated as needed.
18. The OSG requests the intelligent network services control point to release the SRF with an SR-5202 InvokeApp [TC_Continue] message. The message contains the application identifier (UICall), action identifier (release).
19. On receipt of the InvokeApp message, the intelligent network services control point instructs the SSF to release the internal SRF with the DisconnectForwardConnection message and related parameters. The SSF releases the internal SRF.
20. The intelligent network services control point acknowledges the receipt of the release by sending an InvokeApp [TC_Continue] response to the OSG.
21. The application then instructs the OSG (with the routeReq API) to connect the call. The application could also have requested the call to be continued or released. It could have also requested event notification and continued call interaction.
22. The OSG sends the routing instructions to the intelligent network services control point in an SR-5202 InvokeApp [TC_Continue] message. The message contains the application identifier (Call), action identifier (routeReq) and the related parameters.
23. On receipt of the InvokeApp response message, the intelligent network services control point sends a Connect message and related parameters to the SSF instructing it to connect the call.
24. The intelligent network services control point acknowledges the receipt of the routReq by sending an InvokeApp [TC_End] response to the OSG.

Figure 10:
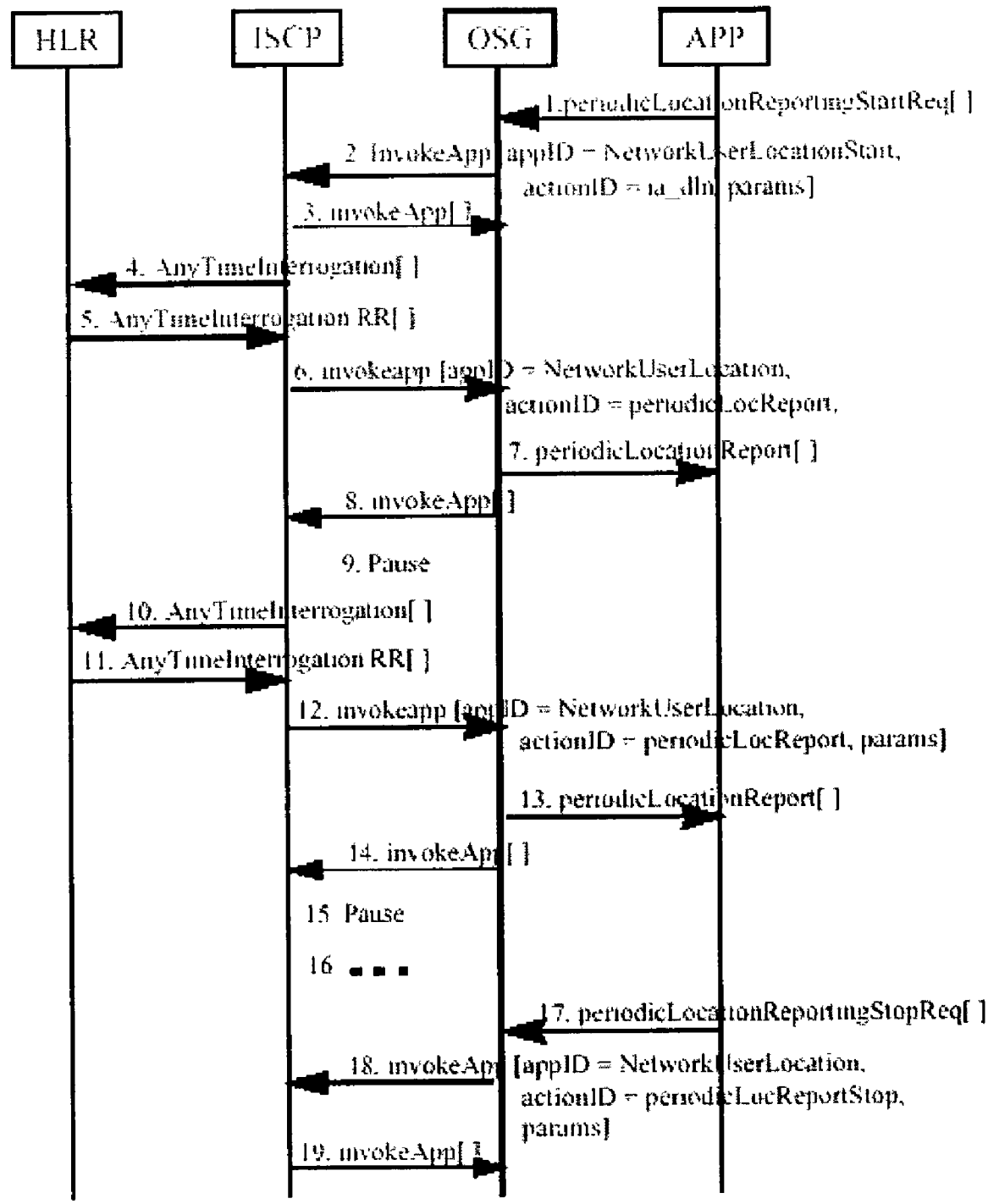
FIG. 10 depicts the process flow a periodic network location reporting scenario; and, FIG. 11 depicts the process flow control for a user status request.

FIG. 10 describes a periodic network location reporting scenario in which the following steps are taken:

1. The application requests (with the periodicLocationReportingStartReq API) the OSG provide periodic location reporting. The API includes the user address and the reporting interval.
2. The OSG sends to the intelligent network services control point the reporting request in an SR-5202 InvokeApp. [TC_Begin] message. The message contains the application identifier (NetworkUserLocationStart), action identifier (ia_dln) and the related parameters, including the user address and the reporting interval.
3. The intelligent network services control point acknowledges the receipt of the networkUserLocationStart by sending an InvokeApp [TC_Continue] response to the OSG.
4. The intelligent network services control point sends to the HLR the AnyTimeInterrogation message requesting current user location.
5. The HLR replies with the AnyTimeInterrogation Return Result message containing the current user location.
6. The intelligent network services control point forwards the current user location to the OSG in an SR-5202 InvokeApp [TC_Continue] message. The message contains the application identifier (NetworkUserLocation), action identifier (periodicLocReport) and the related parameters.
7. The OSG informs the application of the location with the periodicLocationReport API.
8. The OSG acknowledges the receipt of the periodicLocationReport by sending an InvokeApp [TC_Continue] response to the intelligent network services control point.
9. The intelligent network services control point sets a timer (pauses) for the number of minutes specified in the original InvokeApp message.
10. On expiration of the timer, the intelligent network services control point sends to the HLR the AnyTimeInterrogation message requesting current user location.
11. The HLR replies with the AnyTimeInterrogation Return Result message containing the current user location.
12. The intelligent network services control point forwards the current user location to the OSG in an SR-5202 InvokeApp [TC_Continue] message. The message contains the application identifier (NetworkUserLocation), action identifier (periodicLocReport) and the related parameters.
13. The OSG informs the application of the location with the periodicLocationReport API.
14. The OSG acknowledges the receipt of the periodicLocationReport by sending an InvokeApp [TC_Continue] response to the intelligent network services control point.
15. Again the intelligent network services control point sets a timer (pauses) for the number of minutes specified in the original InvokeApp message.
16. Steps 8-12 are repeated until the user location reporting is cancelled. [See steps 17-19].
17. The application cancels (with the periodicLocationReportingStopReq API) periodic location reporting.
18. The OSG sends to the intelligent network services control point the report cancellation request in an SR-5202 InvokeApp [TC_Continue] message. The message contains the application identifier (NetworkUserLocation), action identifier (periodicLocReportStop) and the related parameters. On receipt of the InvokeApp message, the intelligent network services control point cancels the timer and ends the service logic.
19. The intelligent network services control point acknowledges the receipt of the networkUserLocationStop by sending an InvokeApp [TC_End] response to the OSG.

Figure 11:
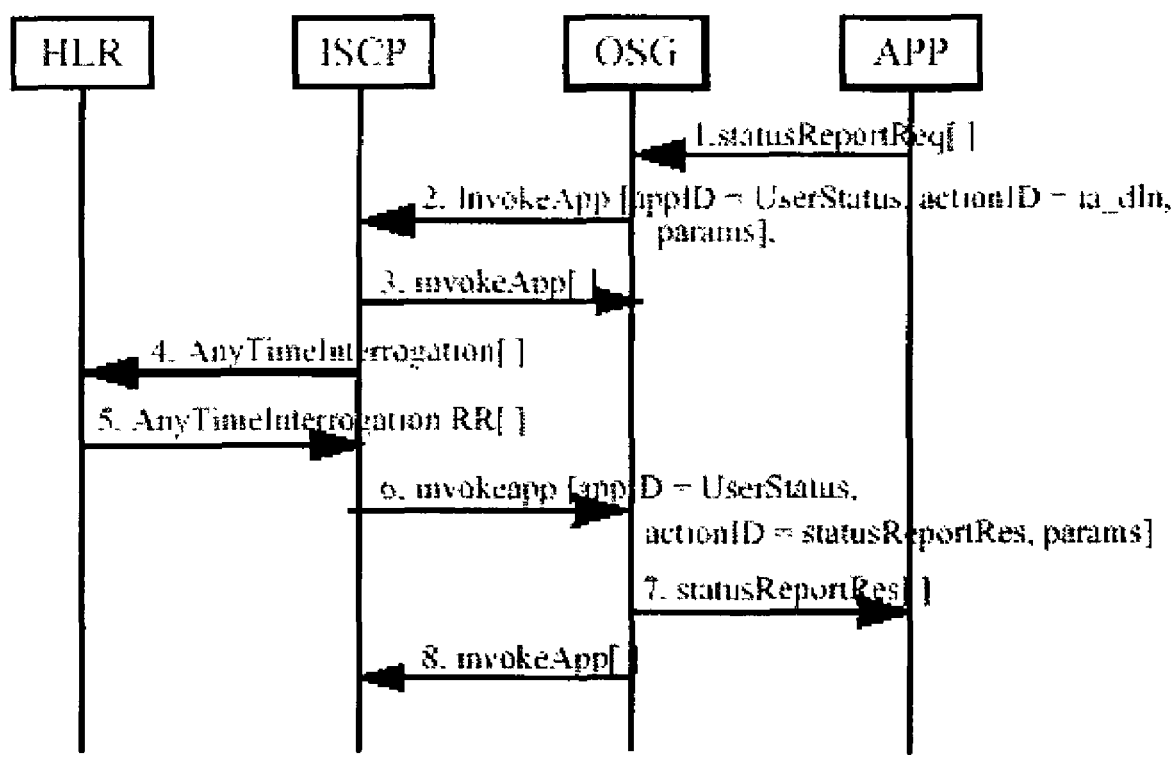

FIG. 11 describes the process flow for a user status request in which the following steps are taken:

1. The application requests (with the statusReportReq API) the OSG provide user status for a particular user address.
2. The OSG sends to the intelligent network services control point the status request in an SR-5202 InvokeApp [TC_Begin] message. The message contains the application identifier (UserStatus), action identifier (ia_dln) and the related parameters, including the user address.
3. The intelligent network services control point acknowledges the receipt of the statusReportReq by sending an InvokeApp [TC_Continue] response to the OSG.
4. The intelligent network services control point sends to the HLR the AnyTimeInterrogation message requesting current user status.
5. The HLR replies with the AnyTimeInterrogation Return Result message containing the current user status.
6. The intelligent network services control point forwards the current user status to the OSG in an SR-5202 InvokeApp [TC_Continue] message. The message contains the application identifier (UserStatus), action identifier (statusReportRes) and the related parameters.
7. The OSG informs the application of the status with the statusReportRes API.
8. The OSG acknowledges the receipt of the statusReportRes by sending an InvokeApp [TC_End] response to the OSG.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A method for providing telecommunications services to a user of a telecommunications netwotk connected to an intelligent network services control point based on one or more applications written in accordance with one or more standard application programming interface (API) comprising the steps of:
   detectinir at the intelligent network services control point that the call must be processed by a standard services application;
   sending a message from the Intelligent network services control point to the open services gateway;
   informing the standard services application from the open services gateway of a call event to be processed by the standard services application;
   receiving at an open services gateway a command from the standard application responsive to the call event with said command formatted in accordance with the standard application programming interface;
   formatting the command at the open services gateway module into a command format acceptable to the intelligent network services control point; and,
   forwarding the formatted command to the intelligent network services control point.

2. The method of claim 1 further comprising the steps of:
   receiving the formatted command at the intelligent network services control point;
   implementing the command in the telecommunications network;
   receiving a response from the telecommunications network responsive to said command;
   sending the response from the intelligent network services control point to the open services gateway;
   formatting the response at the open service gateway into a format in accordance with the standard application programming interface; and,
   forwarding the response to user through the standard application programming interface.

3. The method of claim 1 wherein the step of formatting further comprising the step of
   generating a tagged-value TCP/IP message encapsulating the command.

4. The method of claim 3 wherein the TCP/IP message is formatted in accordance with the generic data interface for the intelligent network services control point.

5. The method of claim 1 wherein the step of formatting further comprises the step of providing an arbitrator interface handle used to communicate with the intelligent network services control point.

6. The method of claim 1 wherein the step of formatting at the open services gateway further comprises sending caller and call information to a data repository module.

7. The method of claim 1 wherein the step of formatting at the open services gateway further comprises providing an alarm through an alarm controller during the occurrence of an abnormal event during call processing.

8. The method of claim 1 in which the step of formatting at the open services gateway further comprises the step of managing the interfaces and classes of an OSA call control module.

9. The method of claim 1 wherein the step of formatting at the open services gateway further comprises the step of managing the interfaces and classes of an OSA user interaction module.

10. The method of claim 1 wherein the step of formatting at the open services gateway further comprises the step of managing the interfaces and classes of an OSA user location module.

11. The method of claim 1 wherein the step of formatting at the open services gateway further comprises the step of managing the interfaces and classes of an OSA user status module.

12. The method of claim 1 wherein changes to the intelligent network services control point are transparent to the applications communicating with said intelligent network services control point through the open services gateway.

13. A method of providing an open services gateway for handling a call from a subscriber in a telecommunications network connected to an intelligent network services control point in which the call is processed by an external application accessed through a standard application programming interface (API) comprising the steps of:
   detecting at the intelligent network services control point that the call must be processed by the external application;
   sending a TCP/IP call notification message from the intelligent network services control point to the open services gateway;
   informing the external application from the open services gateway of a call event to be processed by the external application;
   acknowledging the call notification by sending a response message from the open services gateway to the intelligent network services control point;
   executing the service for the subscriber at the external application and instructing the open services gateway to connect the call;
   sending a TCP/IP message containing the call routing instructions from the open services gateway to the intelligent network services control point;
   sending a connect message to the telecommunications network from the intelligent network services control point sends to connect the call; and,
   acknowledging the receipt of the connect request at the intelligent network services control point.

14. An open services gateway system for communicating commands in real time for providing telecommunications services to a user of a telecommunications network between an intelligent network services control point and external applications written in accordance with a standard application programming interface (API) comprising:

an arbitration module for formatting commands received from the intelligent network services control point through a tagged-value TCP/IP message into a command format in accordance with the standard API of one or more external applications.

15. The system of claim 14 wherein the opens services gateway further comprises a data repository module for controlling a data repository of caller and call information.

16. The system of claim 14 wherein the open services gateway further comprises an alarm controller for providing an alarm during the occurrence of an abnormal event during call processing.

17. The system of claim 14 wherein the open services gateway further comprises an InvokeApp controller for developing the TCP/IP messages.

18. The system of claim 14 wherein the open services gateway further comprises a framework controller that manages all the components that are associated with the external application specifications.

19. The system of claim 14 in which the open services gateway comprises a call control controller for managing the interfaces and classes that together implement the call control module of the external application.

20. The system of claim 14 in which the open services gateway further comprises a user interaction controller for managing the interfaces and classes that implement the user interaction module of the external application.

21. The system of claim 14 in which the open services gateway further comprises a user location controller for managing the interfaces and classes that implement the user location module of the external application.

22. The system of claim 14 in which the open services gateway further comprises a user status controller for managing the interfaces and classes that implement the user status module of the external application.

* * * * *